(12) United States Patent
Cote et al.

(10) Patent No.: US 7,889,961 B2
(45) Date of Patent: Feb. 15, 2011

(54) COMPACT, HIGH-DENSITY ADAPTER MODULE, HOUSING ASSEMBLY AND FRAME ASSEMBLY FOR OPTICAL FIBER TELECOMMUNICATIONS

(75) Inventors: Monique L. Cote, Fort Worth, TX (US); Andrea M. Ozuna, Fort Worth, TX (US); Karyne P. Prevratil, Watagua, TX (US); Diana Rodriguez, Fort Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/079,481

(22) Filed: Mar. 27, 2008

(65) Prior Publication Data

US 2009/0245743 A1 Oct. 1, 2009

(51) Int. Cl.
*G02B 6/00* (2006.01)
(52) U.S. Cl. ..................................... 385/135
(58) Field of Classification Search .................. 385/135
See application file for complete search history.

(56) References Cited

U.S. PATENT DOCUMENTS

| | | | |
|---|---|---|---|
| 4,736,100 A | 4/1988 | Vastagh | 250/227 |
| 4,747,020 A | 5/1988 | Brickley et al. | 361/428 |
| 4,824,193 A | 4/1989 | Maeda et al. | 350/3.72 |
| 4,900,123 A | 2/1990 | Barlow et al. | 350/96.2 |
| 4,948,220 A | 8/1990 | Violo et al. | 350/96.2 |
| 4,995,688 A | 2/1991 | Anton et al. | 350/96.1 |
| 5,023,646 A | 6/1991 | Ishida et al. | 354/402 |
| 5,066,149 A | 11/1991 | Wheeler et al. | 385/135 |

(Continued)

FOREIGN PATENT DOCUMENTS

EP 1203974 5/2002

(Continued)

OTHER PUBLICATIONS

Patent Cooperation Treaty, International Search Report for International Application No. PCT/US2009/001692, Nov. 24, 2009, 2 pages.

(Continued)

*Primary Examiner*—Jerry T Rahll
(74) *Attorney, Agent, or Firm*—John H. Vynalek

(57) ABSTRACT

Adapter modules, housing assemblies that house the adapter modules, and frame assemblies that contain the housing assemblies are disclosed that are all relatively compact and support a relatively high density of components. The modules, assemblies and frames have configurations that take advantage of bend-insensitive cable fibers and jumper fibers. The adapter module is a cassette-like case that allows for a length of cable fiber to be wound tightly therein in a substantially circular loop configuration when closed. The housing assembly houses a plurality of adapter modules and is configured so that the cable and jumper fibers have relatively tight bends within the housing interior. The frame assembly is configured to support a plurality of stacked housing assemblies and to route the jumper fibers through routing conduits and/or routing troughs so that the jumper fibers are enclosed within the frame assembly rather than dangling outside of the frame. The cable fibers enter the back of the housing assemblies via a fiber optic cable arranged at the back of the frame assembly.

28 Claims, 16 Drawing Sheets

U.S. PATENT DOCUMENTS

| | | | |
|---|---|---|---|
| 5,071,211 A | 12/1991 | Debortoli et al. | 385/76 |
| 5,071,220 A | 12/1991 | Ruello et al. | 385/135 |
| 5,073,042 A | 12/1991 | Mulholland et al. | 385/69 |
| 5,074,635 A | 12/1991 | Justice et al. | 385/95 |
| 5,076,688 A | 12/1991 | Bowen et al. | 356/73.1 |
| 5,142,598 A | 8/1992 | Tabone | 385/78 |
| D330,368 S | 10/1992 | Bourgeois et al. | D13/154 |
| 5,204,929 A | 4/1993 | Machall et al. | 385/135 |
| 5,214,735 A | 5/1993 | Henneberger et al. | 385/136 |
| 5,233,674 A | 8/1993 | Vladic | 385/56 |
| 5,243,679 A | 9/1993 | Sharrow et al. | 385/135 |
| 5,260,957 A | 11/1993 | Hakimi et al. | 372/39 |
| 5,274,731 A | 12/1993 | White | 385/135 |
| 5,317,663 A | 5/1994 | Beard et al. | 385/70 |
| 5,323,480 A | 6/1994 | Mullaney et al. | 385/135 |
| 5,333,221 A | 7/1994 | Briggs et al. | 385/55 |
| 5,333,222 A | 7/1994 | Belenkiy et al. | 385/70 |
| 5,339,379 A | 8/1994 | Kutsch et al. | 385/135 |
| 5,359,688 A | 10/1994 | Underwood | 385/70 |
| 5,367,598 A | 11/1994 | Devenish, III et al. | 385/135 |
| 5,383,051 A | 1/1995 | Delrosso et al. | 359/341 |
| 5,402,515 A | 3/1995 | Vidacovich et al. | 385/135 |
| 5,408,557 A | 4/1995 | Hsu | 385/72 |
| RE34,955 E | 5/1995 | Anton et al. | 385/53 |
| 5,420,956 A | 5/1995 | Grugel et al. | 385/135 |
| 5,420,958 A | 5/1995 | Henson et al. | 385/135 |
| 5,438,641 A | 8/1995 | Malacarne | 385/137 |
| 5,442,726 A | 8/1995 | Howard et al. | 385/135 |
| 5,448,015 A | 9/1995 | Jamet et al. | 174/68.3 |
| 5,490,229 A | 2/1996 | Ghandeharizadeh et al. | 385/135 |
| 5,497,444 A | 3/1996 | Wheeler | 385/135 |
| 5,511,144 A | 4/1996 | Hawkins et al. | 385/135 |
| 5,542,015 A | 7/1996 | Hultermans | 385/60 |
| 5,553,183 A | 9/1996 | Bechamps | 385/95 |
| 5,553,186 A | 9/1996 | Allen | 385/135 |
| 5,590,234 A | 12/1996 | Pulido | 385/135 |
| 5,602,954 A | 2/1997 | Nolf et al. | 385/135 |
| 5,613,030 A | 3/1997 | Hoffer et al. | 385/135 |
| 5,617,501 A | 4/1997 | Miller et al. | 385/134 |
| 5,647,043 A | 7/1997 | Anderson et al. | 385/78 |
| 5,689,605 A | 11/1997 | Cobb et al. | 385/135 |
| 5,694,511 A | 12/1997 | Pimpinella et al. | 385/134 |
| 5,708,751 A | 1/1998 | Mattei | 385/135 |
| 5,734,776 A | 3/1998 | Puetz | 385/134 |
| 5,751,882 A | 5/1998 | Daems et al. | 385/135 |
| 5,758,004 A | 5/1998 | Alarcon et al. | 385/135 |
| 5,774,612 A | 6/1998 | Belenkiy et al. | 385/72 |
| 5,793,920 A | 8/1998 | Wilkins et al. | 385/135 |
| 5,793,921 A | 8/1998 | Wilkins et al. | 385/135 |
| 5,796,908 A | 8/1998 | Vicory | 385/135 |
| 5,823,646 A | 10/1998 | Arizpe et al. | 312/324 |
| 5,825,955 A | 10/1998 | Ernst et al. | 385/79 |
| 5,825,961 A | 10/1998 | Wilkins et al. | 385/135 |
| 5,832,162 A | 11/1998 | Sarbell | 385/99 |
| 5,835,657 A | 11/1998 | Suarez et al. | 385/135 |
| 5,835,658 A | 11/1998 | Smith | 385/136 |
| 5,862,290 A | 1/1999 | Burek et al. | 385/135 |
| 5,870,519 A | 2/1999 | Jenkins et al. | 385/135 |
| 5,881,200 A | 3/1999 | Burt | 385/142 |
| 5,883,995 A | 3/1999 | Lu | 385/60 |
| 5,884,003 A | 3/1999 | Cloud et al. | 385/135 |
| 5,892,877 A | 4/1999 | Meyerhoefer | 385/136 |
| 5,930,425 A | 7/1999 | Abel et al. | 385/53 |
| 5,945,633 A | 8/1999 | Ott et al. | 174/59 |
| 5,956,444 A | 9/1999 | Duda et al. | 385/53 |
| 5,969,294 A | 10/1999 | Eberie et al. | 174/57 |
| 5,975,769 A | 11/1999 | Larson et al. | 385/53 |
| 6,009,225 A | 12/1999 | Ray et al. | 385/135 |
| 6,027,252 A | 2/2000 | Erdman et al. | 385/76 |
| 6,044,193 A | 3/2000 | Szentesi et al. | 385/134 |
| 6,061,492 A | 5/2000 | Strause et al. | 385/135 |
| 6,079,881 A | 6/2000 | Roth | 385/76 |
| 6,149,315 A | 11/2000 | Stephenson | 385/60 |
| 6,160,946 A | 12/2000 | Thompson et al. | 385/134 |
| 6,188,687 B1 | 2/2001 | Mussman et al. | 370/388 |
| 6,188,825 B1 | 2/2001 | Bandy et al. | 385/134 |
| 6,192,180 B1 | 2/2001 | Kim et al. | 385/135 |
| 6,208,796 B1 | 3/2001 | Williams Vigliaturo | 385/135 |
| 6,215,938 B1 | 4/2001 | Reitmeier et al. | 385/135 |
| 6,227,717 B1 | 5/2001 | Ott et al. | 385/53 |
| 6,234,683 B1 | 5/2001 | Waldron et al. | 385/78 |
| 6,236,795 B1 * | 5/2001 | Rodgers | 385/134 |
| 6,240,229 B1 | 5/2001 | Roth | 385/53 |
| 6,263,141 B1 | 7/2001 | Smith | 385/135 |
| 6,269,212 B1 | 7/2001 | Schiattone | 385/135 |
| 6,275,641 B1 | 8/2001 | Daoud | 385/135 |
| 6,278,829 B1 | 8/2001 | BuAbbud et al. | 385/135 |
| 6,292,614 B1 | 9/2001 | Smith et al. | 385/135 |
| 6,307,997 B1 | 10/2001 | Walters et al. | 385/134 |
| RE37,489 E | 1/2002 | Anton et al. | 385/53 |
| 6,347,888 B1 | 2/2002 | Puetz | 385/53 |
| 6,353,697 B1 | 3/2002 | Daoud | 385/136 |
| 6,359,228 B1 | 3/2002 | Strause et al. | 174/91 |
| 6,363,200 B1 | 3/2002 | Thompson et al. | 385/135 |
| 6,379,166 B1 | 4/2002 | Hagarty et al. | 439/135 |
| 6,411,767 B1 | 6/2002 | Burrous et al. | 385/135 |
| 6,418,262 B1 | 7/2002 | Puetz et al. | 385/134 |
| 6,424,781 B1 | 7/2002 | Puetz et al. | 385/135 |
| 6,425,694 B1 | 7/2002 | Szilagyi et al. | 385/76 |
| 6,431,762 B1 | 8/2002 | Taira et al. | 385/56 |
| 6,434,313 B1 | 8/2002 | Clapp, Jr. et al. | 385/135 |
| 6,438,310 B1 | 8/2002 | Lance et al. | 385/135 |
| 6,452,925 B1 | 9/2002 | Sistanizadeh et al. | 370/352 |
| 6,464,402 B1 | 10/2002 | Andrews et al. | 385/53 |
| D466,087 S | 11/2002 | Cuny et al. | D13/152 |
| 6,480,487 B1 | 11/2002 | Wegleitner et al. | 370/354 |
| 6,480,660 B1 | 11/2002 | Reitmeier et al. | 385/135 |
| 6,483,977 B2 | 11/2002 | Battey et al. | 385/135 |
| 6,496,640 B1 | 12/2002 | Harvey et al. | 385/135 |
| 6,539,147 B1 | 3/2003 | Mahony | 385/24 |
| 6,539,160 B2 | 3/2003 | Battey et al. | 385/135 |
| 6,542,688 B1 | 4/2003 | Battey et al. | 385/135 |
| 6,554,485 B1 | 4/2003 | Beatty et al. | 385/72 |
| 6,567,601 B2 | 5/2003 | Daoud et al. | 385/135 |
| 6,577,595 B1 | 6/2003 | Counterman | 370/230 |
| 6,577,801 B2 | 6/2003 | Broderick et al. | 385/125 |
| 6,597,670 B1 | 7/2003 | Tweedy et al. | 370/328 |
| 6,612,515 B1 | 9/2003 | Tinucci et al. | 242/388.1 |
| 6,614,980 B1 | 9/2003 | Mahony | 385/135 |
| 6,621,975 B2 | 9/2003 | Laporte et al. | 385/135 |
| 6,625,374 B2 | 9/2003 | Holman et al. | 385/135 |
| 6,625,375 B1 | 9/2003 | Mahony | 385/135 |
| 6,631,237 B2 | 10/2003 | Knudsen | 385/134 |
| 6,654,536 B2 | 11/2003 | Battey et al. | 385/134 |
| 6,668,127 B1 | 12/2003 | Mahony | 385/135 |
| 6,710,366 B1 | 3/2004 | Lee et al. | 257/14 |
| 6,778,752 B2 | 8/2004 | Laporte et al. | 385/135 |
| 6,819,856 B2 | 11/2004 | Dagley et al. | 385/134 |
| 6,819,857 B2 | 11/2004 | Douglas et al. | 385/135 |
| 6,845,207 B2 | 1/2005 | Schray | 385/135 |
| 6,850,685 B2 | 2/2005 | Tinucci et al. | 385/134 |
| 6,865,334 B2 | 3/2005 | Cooke et al. | 385/139 |
| 6,870,734 B2 | 3/2005 | Mertesdorf et al. | 381/684 |
| 6,870,997 B2 | 3/2005 | Cooke et al. | 385/135 |
| 6,879,545 B2 | 4/2005 | Cooke et al. | 367/149 |
| 6,920,273 B2 | 7/2005 | Knudsen | 385/135 |
| 6,920,274 B2 | 7/2005 | Rapp et al. | 385/135 |
| 6,925,241 B2 | 8/2005 | Bohle et al. | 381/135 |
| 6,934,451 B2 | 8/2005 | Cooke et al. | 385/100 |
| 6,944,383 B1 | 9/2005 | Herzog et al. | 385/123 |
| 6,968,107 B2 | 11/2005 | Belardi et al. | 385/127 |
| 7,006,748 B2 | 2/2006 | Dagley et al. | 385/134 |
| 7,027,695 B2 | 4/2006 | Cooke et al. | 385/105 |
| 7,054,513 B2 | 5/2006 | Herz et al. | 385/12 |

| | | | |
|---|---|---|---|
| 7,068,907 B2 | 6/2006 | Schray | 385/135 |
| 7,103,255 B2 | 9/2006 | Reagan et al. | 385/135 |
| 7,110,654 B2 | 9/2006 | Dillat | 385/135 |
| 7,120,347 B2 | 10/2006 | Blackwell, Jr. et al. | 385/135 |
| 7,200,316 B2 | 4/2007 | Giraud et al. | 385/135 |
| 7,272,291 B2 | 9/2007 | Bayazit et al. | 385/135 |
| 7,274,852 B1 | 9/2007 | Smrha et al. | 385/135 |
| 7,302,153 B2 | 11/2007 | Thom | 385/135 |
| 7,421,182 B2 | 9/2008 | Bayazit et al. | 385/135 |
| 7,460,757 B2 | 12/2008 | Hoehne et al. | 385/135 |
| 7,477,826 B2 | 1/2009 | Mullaney et al. | 385/134 |
| 2002/0034290 A1 | 3/2002 | Pershan | 379/207.02 |
| 2003/0174996 A1 | 9/2003 | Henschel et al. | 385/135 |
| 2004/0074852 A1 | 4/2004 | Knudsen et al. | 211/26 |
| 2004/0175090 A1* | 9/2004 | Vastmans et al. | 385/135 |
| 2004/0228598 A1 | 11/2004 | Allen et al. | 385/135 |
| 2004/0264873 A1 | 12/2004 | Smith et al. | 385/53 |
| 2005/0002633 A1 | 1/2005 | Solheid et al. | 385/135 |
| 2005/0123261 A1 | 6/2005 | Bellekens et al. | 385/135 |
| 2005/0129379 A1 | 6/2005 | Reagan et al. | 385/135 |
| 2006/0093303 A1 | 5/2006 | Reagan et al. | 385/135 |
| 2006/0153517 A1 | 7/2006 | Reagan et al. | 385/135 |
| 2006/0215980 A1 | 9/2006 | Bayazit et al. | 385/135 |
| 2007/0003204 A1 | 1/2007 | Makrides-Saravanos et al. | 385/135 |
| 2007/0031099 A1* | 2/2007 | Herzog et al. | 385/135 |
| 2007/0047894 A1 | 3/2007 | Holmberg et al. | 385/135 |

FOREIGN PATENT DOCUMENTS

| | | |
|---|---|---|
| EP | 1316829 | 6/2003 |
| JP | 2007-47336 | 2/2007 |
| WO | WO2007/050515 | 5/2007 |

OTHER PUBLICATIONS

Patent Cooperation Treaty, Annex to the Invitation to Pay Additional Fees for International Application No. PCT/US2009/001692, Jul. 30, 2009, 1 Page.

Hitachi Cable Review No. 24, "Low-loss Holey Fiber", Aug. 2005, 5 pages.

Draka, Draka Comteq | Optical Fibre, "BendBright$^{XS}$ Single Mode Optical Fibre, Enhanced low macrobending sensitive, low water peak fibre, Product Type: G.652D, Coating Type: ColorLock™ and Natural", Issue Date: Aug. 2006, Supersedes. -/-, www.drakafibre.com | www.draka.com, 2 pages.

www.everythingfiberoptic.com, Splice Trays, Copyright © At Last Electronics Corp. 2006.

www.siemon.com/us/oem/splice_tray.asp, © 1995-2006 Siemon, www.siemon.com, The Siemon Company, Siemon Business Park, 1010 Siemon Drive, Watertown, CT 06795-0400 USA.

www.adckrone.com, Products and Services, Splice Trays, Copyright © 2006, ADC.

Corning Cable Systems, Splice Trays, A LANscape® Solutions Product, Product Specifications (5 pages), Corning Cable Systems LLC, P.O. Box 489, Hickory, NC 28603-0489 USA, May 2005.

International Telecommunication Union, ITU-T G.652, Telecommunication Standardization Sector of ITU, Jun. 2005, Series G: Transmission Systems and Media, Digital Systems and Networks, Transmission media characteristics—Optical fibre cables, Characteristics of a single-mode optical fibre and cable, ITU-T Recommendation G.652, 22 pgs.

International Telecommunication Union, ITU-T G.657, Telecommunication Standardization Sector of ITU, Dec. 2006, Series G: Transmission Systems and Media, Digital Systems and Networks, Transmission media and optical systems characteristics—Optical Fibre Cables, Characteristics of a bending loss insensitive single mode optical fibre and cable for the access network, ITU-T Recommendation G.657, 20 pgs.

Gibson et al., Evanescent Field Analysis of Air-Silica Microstructure Waveguides, IEEE, 0-7803-7105-4/01, 2001, pp. 709-710.

Monro et al., "Holey Fibers with random cladding distributions" Optic Letters, vol. 25, No. 4; Feb. 15, 2000.

Pickrell et al., "Novel Techniques for the Fabrication of Holey Optical Fibers" Spie Conference Proceedings, vol. 4578, pp. 271-282; 2001.

Patent Cooperation Treaty, International Search Report for International Application No. PCT/US2008/002514, Aug. 8, 2008, 1 page.

* cited by examiner

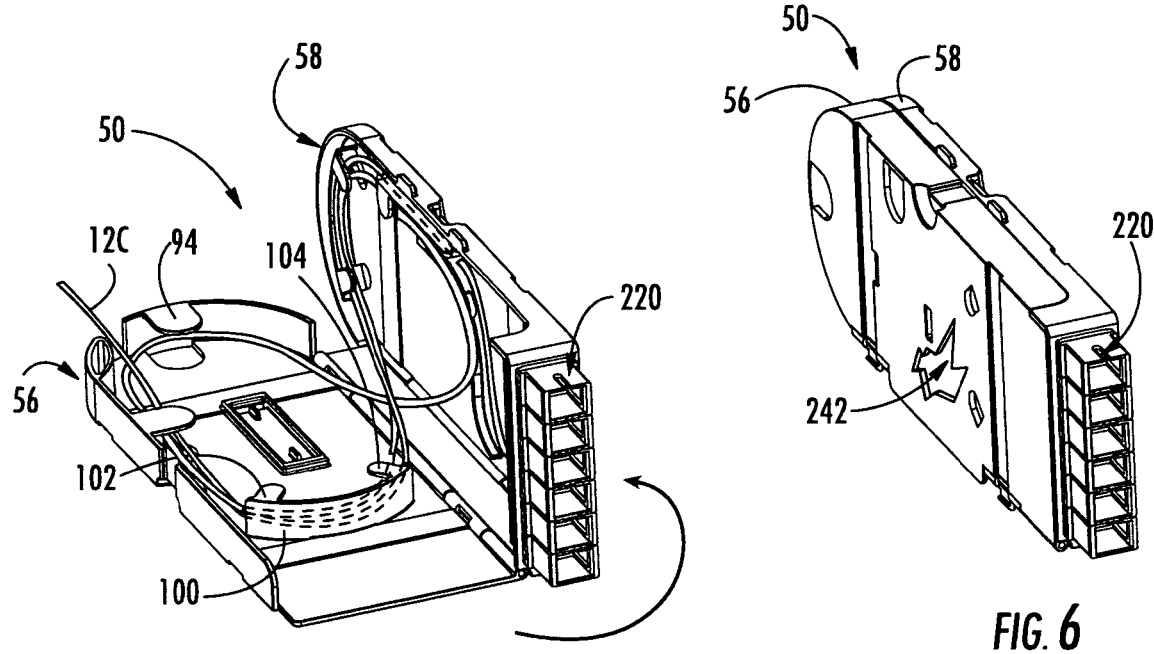

COMPACT, HIGH-DENSITY ADAPTER MODULE, HOUSING ASSEMBLY AND FRAME ASSEMBLY FOR OPTICAL FIBER TELECOMMUNICATIONS

FIELD OF THE INVENTION

The present invention relates generally to optical fiber telecommunications equipment and networks, and in particular relates to adapter modules, housing assemblies and frame assemblies that are relatively compact and that can contain a relatively high density of telecommunication system components.

BACKGROUND OF THE INVENTION

The typical optical telecommunication systems and networks include one or more telecommunications data centers that provide large numbers of optical and electrical cable connections that join various types of network equipment. The typical system also includes a number of outlying stations that extend the system into a network. Examples of network equipment include electrically-powered (active) units such as optical line terminals (OLTs), optical network terminals (ONTs), network interface devices (NIDs), servers, splitters, combiners, multiplexers, switches and routers, fanout boxes and patch panels. This network equipment is often installed within cabinets in equipment racks or frames. Each piece of equipment typically provides one or more adapters where optical or electrical patch cables can be physically connected to the equipment. These patch cables are generally routed to other network equipment located in the same cabinet or to another cabinet. The optical patch cables are also called "jumper fibers."

A common problem in telecommunications systems, and in particular with telecommunications equipment, is space management. Current practice in telecommunications is to utilize electronics racks or frames that support stationary rack-mounted housings. The housings may be fixed slide-out or swing-out patch/splice panel or shelves. However, the configurations and sizes of present-day adapter modules, housing assemblies, and frame assemblies have been defined by the properties of the fiber optic cables that connect to the devices within the housings. In particular, the configurations and sizes have been established based on the particular ability of the fiber optic cables and optical fibers therein to interface with the devices without exceeding the bending tolerance of the fiber optic cable and/or the optical fibers. This has resulted in telecommunications equipment that occupies relatively large amounts of space, and in particular a relatively large amount of floor space in a central office of a telecommunications network.

It would be advantageous to have adapter modules, housing assemblies and frame assemblies having a compact configuration and size that could support a higher density of devices and components than present-day modules and assemblies.

SUMMARY OF THE INVENTION

The present invention relates to adapter modules, housing assemblies that house the adapter modules, and frame assemblies that contain the housing assemblies, all being relatively compact and able to support a relatively high density of components. The modules, assemblies and frames have configurations that take advantage of cable fibers and jumper fibers that are bend-insensitive. The adapter module is a cassette-like case that allows for a length of cable fiber to be wound tightly therein so that it can be connected to a jumper fiber via one of the module's adapters. The housing assembly houses a plurality of adapter modules and is configured so that the cable and jumper fibers have relatively tights bends within the housing interior. The frame assembly is configured to support a plurality of stacked housing assemblies and to route the jumper fibers through routing conduits and/or routing troughs so that the jumper fibers are enclosed within the frame assembly rather than dangling outside of the frame. The cable fibers enter the back of the housing assemblies via a fiber optic cable directed to and supported at or near the back of the frame assembly.

Accordingly, a first aspect of the invention is an adapter module that supports at least one bend-insensitive optical fiber. The adapter module includes first and second module sections configured to mate when folded together so as to form a module interior. The first and second module sections each include a curved sidewall and a curved inner wall that serve to maintain the at least one bend-insensitive fiber in a serpentine configuration that includes at least first and second bends when the first and second module sections are open. The adapter module also includes at least one adapter arranged at an end of the second module section and configured to connect to an end of the at least one bend-insensitive fiber. When the first and second module sections are folded together and mated, they enclose and support the at least one bend-insensitive fiber in a substantially circular loop configuration within the module interior.

A second aspect of the invention is a housing assembly for containing one or more adapter modules each having at least one adapter, so as to connect at least one bend-insensitive cable fiber to at least one bend-insensitive jumper fiber. The housing assembly includes a cover that defines a cover interior region with a rectangular cross-section and an open cover end. The housing assembly also includes a drawer configured to clearance fit within the cover and slideably move into and out of the cover interior region to open and close the drawer, the drawer having means for holding the one or more adapter modules. The at least one bend-insensitive cable fiber enters a rear portion of the cover and is arranged in a serpentine configuration having at least first and second bends and connected at its end to one of the one or more adapter modules. The serpentine configuration of the cable fiber respectively expands and contracts when the drawer is opened and closed.

A third aspect of the invention is a frame assembly that includes a frame in the form of an inverted "U" that includes first and second vertical side bars, a top horizontal cross bar, and a base connected to the side bars. The frame has a front side and a backside and a frame interior. The frame assembly also includes a plurality of housing assemblies held within the frame interior in a stacked manner. Jumper fibers pass through apertures in the side of the housing assemblies and are used to connect to adapter modules housed in the housing assemblies, while cable fibers are connected to the back of the housing assemblies at the back of the frame. The frame assembly has a footprint that is significantly smaller than prior art frame assemblies, and is also configured to keep the cable and jump fibers contained within the assembly rather than dangling freely outside of the frame.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate the various exemplary embodiments of the invention, and together with the description serve to explain the principals and operations of the invention.

BRIEF DESCRIPTION OF THE DRAWINGS

FIG. 5 is a perspective view of the adapter module of FIG. 3, wherein the module sections are partially rotated about their hinges in the process of closing the module;

FIG. 6 is a perspective view of the closed adapter module of FIG. 5;

DETAILED DESCRIPTION OF THE INVENTION

Figure 1:
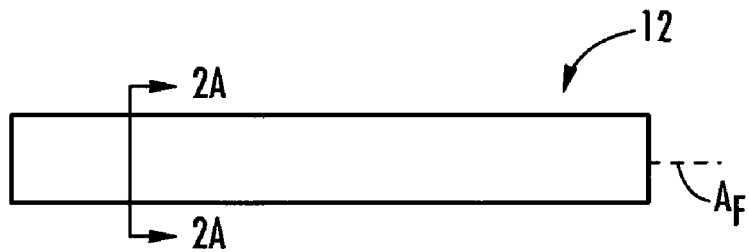
FIG. 1 is a schematic side view of a section of an example embodiment of a bend-insensitive optical fiber in the form of a nanostructure optical fiber.

Reference is now made in detail to the present preferred embodiments of the invention, examples of which are illustrated in the accompanying drawings. Whenever possible, like or similar reference numerals are used throughout the drawings to refer to like or similar parts. It should be understood that the embodiments disclosed herein are merely examples, each incorporating certain benefits of the present invention. Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein.

Terms such as "horizontal," "vertical," "front," "back," etc., are used herein for the sake of reference in the drawings and ease of description and are not intended to be strictly limiting either in the description or in the claims as to an absolute orientation and/or direction.

Bend-Insensitive Optical Fibers

Example embodiments of the present invention make use of bend-insensitive or "bend performance" fibers such as those in the form of so-called "nanostructure" or "holey" optical fibers. There are a number of such fibers on the market today. Nanostructure fibers have one or more regions with periodically or aperiodically arranged small holes or voids, which make the fiber extremely bend insensitive. Examples of such optical fibers are described in, for example, U.S. Pat. No. 6,243,522, pending U.S. patent application Ser. No. 11/583,098 filed Oct. 18, 2006, and provisional U.S. patent application Ser. Nos. 60/817,863 filed Jun. 30, 2006; 60/817,721 filed Jun. 30, 2006; 60/841,458 filed Aug. 31, 2006; 60/841,490 filed Aug. 31, 2006; and 60/879,164, filed Jan. 8, 2007 (hereinafter, "the Corning nanostructure fiber patents and patent applications"), all of which are assigned to Corning Incorporated, and all of which are incorporated by reference herein.

Bend-insensitive fibers as used in the present invention include, for example, nanostructure fibers of the type available from Corning, Inc., of Corning, N.Y., including, but not limited to, single-mode, multi-mode, bend performance fiber, bend-optimized fiber and bend-insensitive optical fiber. Nanostructure fibers are advantageous in that they allow for the tap assemblies of the present invention to have fibers with relatively small-radius bends while optical attenuation in the fibers remains extremely low. One example of a bend-insensitive optical fiber includes a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than about 1310 nm, in other embodiments also greater than 1260 nm. The optical fibers provide a mode field at a wavelength of 1310 nm preferably greater than 8.0 μm, and more preferably between about 8.0 and 10.0 μm.

One type of nanostructure optical fiber developed by Corning, Inc. has an annular ring of non-periodic airlines (of diameter ~1×10$^{-7}$ m) that extend longitudinally along the length of the fiber. The region with the ring of airlines has a reduced apparent or average index of refraction, because air has an index of refraction of approximately 1 compared to the fused silica matrix refractive index of approximately 1.46. The ring of airlines is positioned to create a refractive index profile that enables superior bend performance (optically) and significantly smaller minimum bend radius specifications.

Figure 2A:
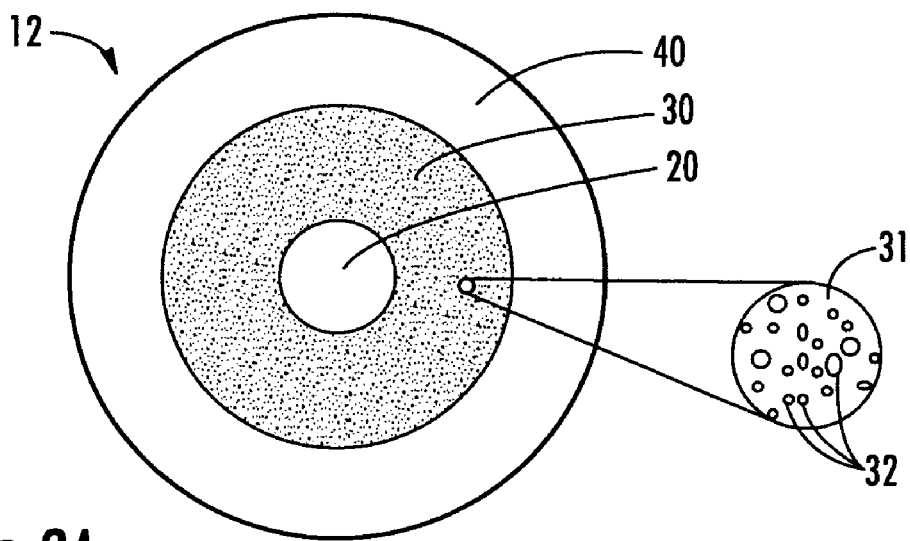
FIG. 2A is a schematic cross-section of the optical fiber of FIG. 1 as viewed along the direction 2A-2A.

FIG. 1 is a schematic side view of a section of an example embodiment of a bend-insensitive fiber in the form of a nanostructure optical fiber ("nanostructure fiber") 12 having a central axis $A_F$. FIG. 2A is a schematic cross-section of nanostructure fiber 12 as viewed along the direction 2A-2A in FIG. 1. Nanostructure fiber 12 can be, for example, any one of the various types of nanostructure optical fibers, such as any of the so-called "holey" fibers, or those described in the above-mentioned Corning nanostructure fiber patents and patent applications. For the purposes of the present invention, a "bend-insensitive fiber" includes nanostructure fibers that make use of periodic or non-periodic nanostructures or holes.

In an example embodiment, nanostructure optical fiber 12 includes a core region ("core") 20, a nanostructure region 30 surrounding the core, and an outer cladding region 40 ("cladding") surrounding the nanostructure region. Other ring-type configurations for nanostructure optical fiber 12 are also known. A protective cover or sheath (not shown) optionally covers outer cladding 40.

In an example embodiment, nanostructure region 30 comprises a glass matrix ("glass") 31 having formed therein non-periodically disposed holes (also called "voids" or "airlines") 32, such as the example voids shown in detail in the magnified inset of FIG. 2A. In another example embodiment, voids 32 may be periodically disposed, such as in a photonic crystal optical fiber, wherein the voids typically have diameters between about 1×10$^{-6}$ m and 1×10$^{-5}$ m. Voids 32 may also be "non-periodic airlines. In an example embodiment, glass 31 is fluorine-doped while in another example embodiment the glass is undoped pure silica. By "non-periodically disposed" or "non-periodic distribution," it is meant that when one takes a cross-section of the optical fiber (such as shown in FIG. 2A), the voids 32 are randomly or non-periodically distributed across a portion of the fiber.

Cross sections similar to FIG. 2A taken at different points along the length of nanostructure optical fiber 12 will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber (and thus have a longer dimension along the length of the fiber), but do not extend the entire length of the entire fiber for typical lengths of transmission fiber. While not wishing to be bound by theory, it is believed that the holes extend less than a few meters, and in many cases less than 1 meter along the length of the fiber.

If non-periodically disposed holes/voids 32 are employed in nanostructure region 30, it is desirable in one example embodiment that they be formed such that greater than 95% of and preferably all of the holes exhibit a mean hole size in the cladding for the optical fiber which is less than 1550 nm, more preferably less than 775 nm, most preferably less than about 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× to about 4000× and image analysis software, such as ImagePro, which is available from Media Cybernetics, Inc. of Silver Spring, Md., USA.

In an example embodiment, holes/voids 32 can contain one or more gases, such as argon, nitrogen, or oxygen, or the holes can contain a vacuum with substantially no gas; regardless of the presence or absence of any gas, the refractive index of the hole-containing region is lowered due to the presence of the holes. The holes can be periodically or non-periodically disposed. In some embodiments, the plurality of holes comprises a plurality of non-periodically disposed holes and a plurality of periodically disposed holes. Alternatively, or in addition, as mentioned above, the depressed index can also be provided by downdoping the glass in the hole-containing region (such as with fluorine) or updoping one or both of the surrounding regions.

Nanostructure region 30 can be made by methods that utilize preform consolidation conditions, which are effective at trapping a significant amount of gases in the consolidated glass blank, thereby causing the formation of voids in the consolidated glass optical fiber preform. Rather than taking steps to remove these voids, the resultant preform is used to form an optical fiber with voids, or holes, therein. As used herein, the diameter of a hole is the longest line segment whose end points are disposed on the silica internal surface defining the hole when the optical fiber is viewed in a perpendicular cross-section transverse to the optical fiber central axis $A_F$.

SEM analysis of the end face of an example nanostructure optical fiber 12 showed an approximately 4.5 micron radius GeO$_2$—SiO$_2$ void-free core (having an index of approximately +0.34 percent delta versus silica) surrounded by a 11-micron outer radius void-free near cladding region surrounded by 14.3-micron outer radius non-periodic void-containing cladding region (ring thickness of approximately 3.3 μm), which is surrounded by a void-free pure silica outer cladding having an outer diameter of about 125 μm (all radial dimensions measured from the center of the optical fiber).

The nanostructure region comprised approximately 2.5 percent regional area percent holes (100% N$_2$ by volume) in that area with an average diameter of 0.28 μm and the smallest diameter holes at 0.17 μm and a maximum diameter of 0.48 μm, resulting in a total of about 130 holes in the fiber cross-section. The total fiber void area percent (area of the holes divided by total area of the optical fiber cross-section×100) was about 0.05 percent. Optical properties for this fiber were 0.36 and 0.20 dB/Km at 1310 and 1550 nm, respectively, and a 22-meter fiber cable cut-off of about 1250 nm, thereby making the fiber single mode at wavelengths above 1250 nm.

The nanostructure optical fibers as used herein may or may not include germania or fluorine to adjust the refractive index of the core and/or cladding of the optical fiber, but these dopants can also be avoided in the intermediate annular region and instead, the holes (in combination with any gas or gases that may be disposed within the holes) can be used to adjust the manner in which light is guided down the fiber core. The nanostructure region may consist of undoped (pure) silica, thereby completely avoiding the use of any dopants in the hole-containing region, to achieve a decreased refractive index, or the nanostructure region may comprise doped silica, e.g. fluorine-doped silica having a plurality of holes. In one set of embodiments, the core includes doped silica to provide a positive refractive index relative to pure silica, e.g. germania doped silica. The core region is preferably hole-free.

Such fiber can be made to exhibit a fiber cut-off of less than 1400 nm, more preferably less than 1310 nm, a 20-mm macrobend induced loss at 1550 nm of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, a 12-mm macrobend induced loss at 1550 nm of less than 5 dB/turn, preferably less than 1 dB/turn, more preferably less than 0.5 dB/turn, even more preferably less than 0.2 dB/turn, still more preferably less than 0.1 dB/turn, still even more preferably less than 0.05 dB/turn, and an 8-mm macrobend induced loss at 1550 nm of less than 5 dB/turn, preferably less than 1 dB/turn, more preferably less than 0.5 dB/turn, and even more preferably less than 0.2 dB/turn, and still even more preferably less than 0.1 dB/turn.

The nanostructure fibers used herein may be multimode. Such fibers may comprise, for example, a graded-index core region and a cladding region surrounding and directly adjacent to the core region, the cladding region comprising a depressed-index annular portion comprising a depressed relative refractive index, relative to another portion of the cladding (which preferably is silica, which is not doped with an index of refraction altering dopant such as germania or fluorine). Preferably, the refractive index profile of the core has a parabolic shape. The depressed-index annular portion may comprise glass comprising a plurality of holes, fluorine-doped glass, or fluorine-doped glass comprising a plurality of holes. The depressed index region can be adjacent to or spaced apart from the core region.

In an example embodiment, the multimode nanostructure optical fiber exhibits very low bend-induced attenuation, in particular very low macrobending. In some embodiments, high bandwidth is provided by low maximum relative refractive index in the core, and low bend losses are also provided. In some embodiments, the core radius is large (e.g. greater than 20 μm), the core refractive index is low (e.g. less than 1.0%), and the bend losses are low. In an example embodiment, the multimode nanostructure optical fiber exhibits a spectral attenuation of less than 3 dB/km at 850 nm.

In an example embodiment, the numerical aperture (NA) of the nanostructure optical fiber used herein is preferably greater than the NA of the optical source directing signals into the fiber; for example, the NA of the optical fiber is preferably greater than the NA of a VCSEL light source. The bandwidth of the multimode optical fiber varies inversely with the square of $\Delta 1_{MAX}$. For example, a multimode optical fiber with $\Delta 1_{MAX}$ of 0.5% can yield a bandwidth 16 times greater than an otherwise identical multimode optical fiber except having a core with $\Delta 1_{MAX}$ of 2.0%. In some embodiments, the core extends radially outwardly from the centerline to a radius R1, wherein 12.5 μm≦R1≦40 μm. In some embodiments, 25 μm≦R1≦32.5 μm, and in some of these embodiments, R1 is greater than or equal to about 25 μm and less than or equal to about 31.25 μm. The core preferably has a maximum relative refractive index less than or equal to 1.0%. In other embodiments, the core has a maximum relative refractive index less than or equal to 0.5%. Such multimode fibers preferably exhibit a 1-turn 10 mm diameter mandrel attenuation increase of no more than 1.0 dB, preferably no more than 0.5 dB, more preferably no more than 0.25 dB, even more preferably no more than 0.1 dB, and still more preferably no more than 0.05 dB, at all wavelengths between 800 and 1400 nm.

Fiber Bend Angle and Bend Diameter

Figure 2B:
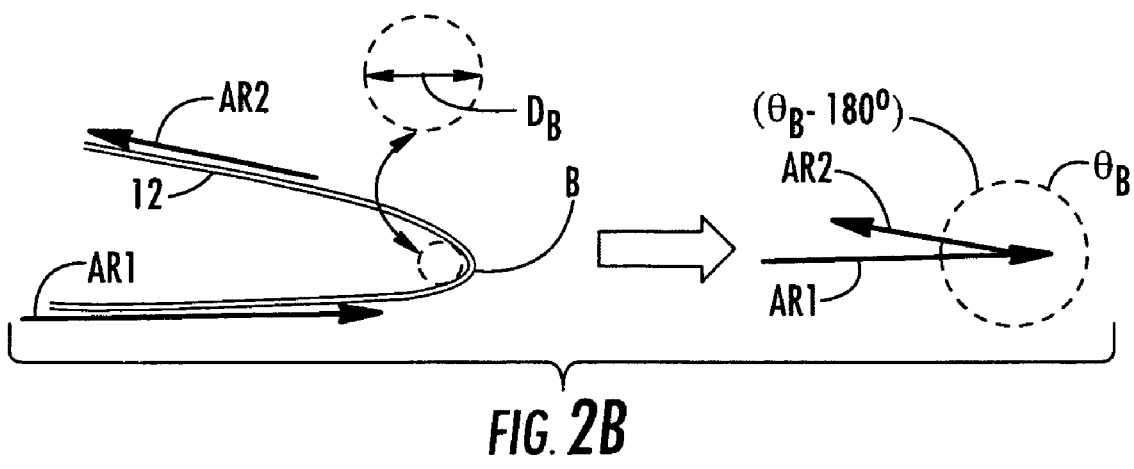
FIG. 2B is a schematic diagram illustrating the bend angle $\theta_B$ and the bend diameter $D_B$ of a bend formed in the bend-insensitive optical fiber of FIG. 1.

FIG. 2B is a schematic diagram illustrating a bend angle $\theta_B$ and a bend diameter $D_B$ of an example bend-insensitive optical fiber in the form of nanostructure fiber 12 having a bend formed therein. Bend diameter $D_B$ is twice the bend radius $R_B$. Two arrows AR1 and AR2 represent the relative orientations (directions) of optical fiber 12 on either side of bend B. Bend angle $\theta_B$ is defined by the intersection of arrows AR1 and AR2, as shown in the right-hand side of FIG. 2B. Because sections of optical fiber do not always remain perfectly straight before and after a bend, the bend angle $\theta_B$ is not exact, but serves as a useful approximation that generally describes the degree to which nanostructure fiber 12 is bent.

In an example embodiment, the bend-insensitive optical fibers used in the present invention have bends like bend B with a bend diameter $D_B$ as small as 10 mm. This, in part, allows for the adapter modules, the housing assemblies, and the frame assemblies of the present invention to be very compact and allow for a high density of components.

In the discussion hereinafter, for the sake of convenience, reference number 12 is used to refer to bend-insensitive fibers generally, with bend-insensitive cable fibers carried by an optical fiber cable being identified as 12C to distinguish from bend-insensitive jumper fibers, which are identified as 12J.

Adapter Module

Figure 3:
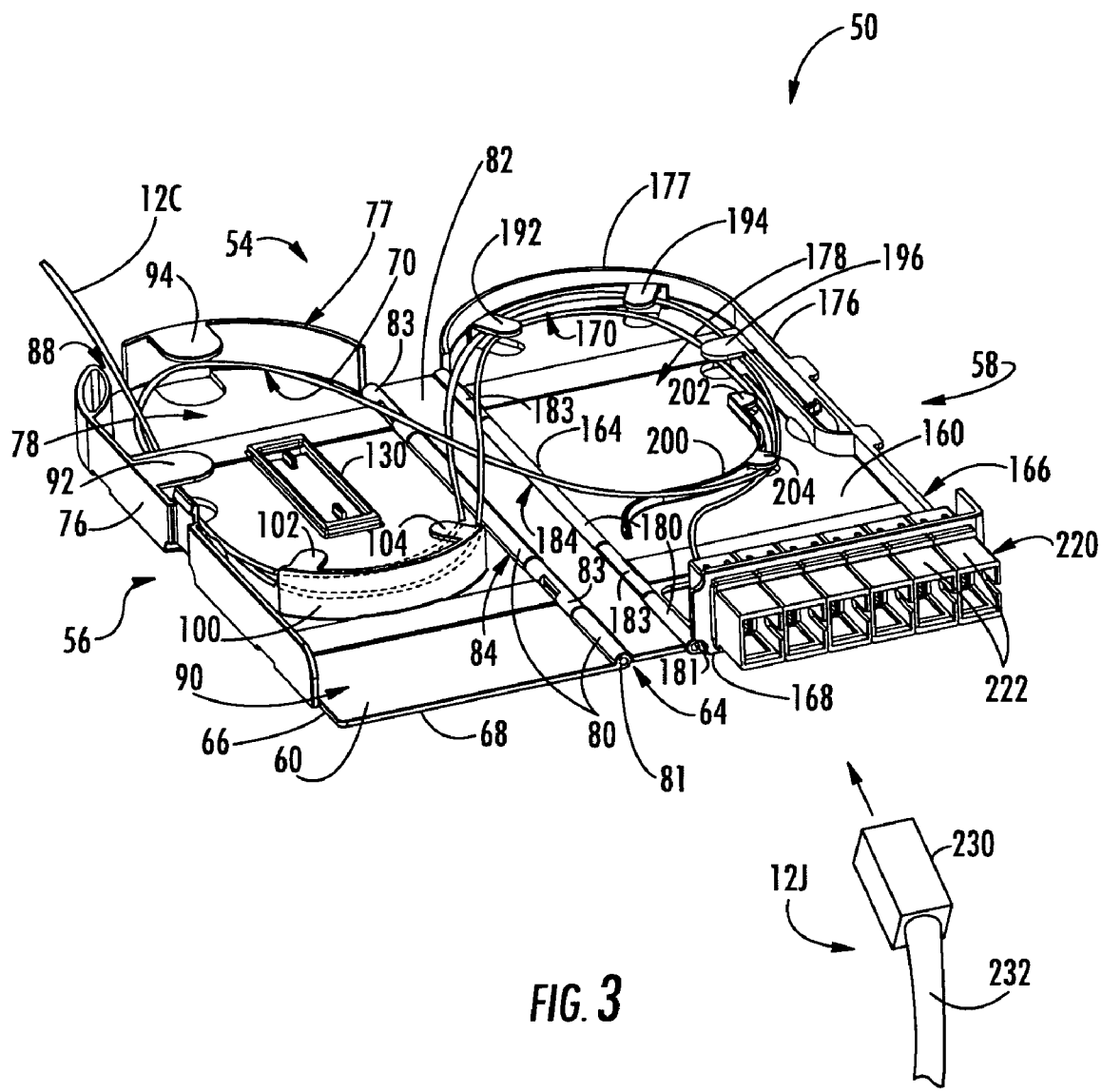
FIG. 3 is a perspective view of example embodiment of an adapter module used to connect at least one input optical fiber to at least one output optical fiber.

FIG. 3 is a perspective view of example embodiment of an adapter module 50 that is used to connect at least one input optical fiber to at least one output optical fiber. Adapter module 50 includes a cassette-type foldable housing 54 made up of two mating module sections 56 and 58. FIG. 3 illustrates adapter module 50 in its open position. Module sections 56 and 58 are preferably made of a rigid material such as metal or hard plastic.

Module section 56 includes a flat panel 60 having parallel inside and outside edges 64 and 66, a straight end 68 perpendicular to the parallel sides, and a rounded edge 70 opposite the straight end. A sidewall 76 is attached to outside edge 66 and runs from close to straight end 68 and around rounded edge 70. Sidewall 76 thus includes a curved section 77 that curves around rounded edge 70. Panel 60 and sidewall 76 define an open interior region 78 for module section 56.

Inside edge 64 includes hinge portions 80 that are operably connected via a hinge rod 81 to a hinge panel 82 that includes hinge portions 83 interlocked with hinge portions 80. Hinge rod 81 passes through the interlocked hinge portions 80 of panel 60 and hinge portions 83 of hinge panel 82 to form a hinge 84.

In an example embodiment, curved section 77 of sidewall 76 includes a gap 88 sized to allow one or more optical fibers 12 to pass therethrough, as discussed in greater detail below. There is also preferably a space 90 between sidewall 76 and straight end 68 to accommodate the mating of module sections 56 and 58. Sidewall 76 also includes two tongues 92 and 94 that extend inwardly from the top of the sidewall into interior region 78. Tongue 92 is located on straight portion of sidewall 76, while tongue 94 is located on curved sidewall section 77. The role of tongues 92 and 94 is discussed below.

Figure 4:
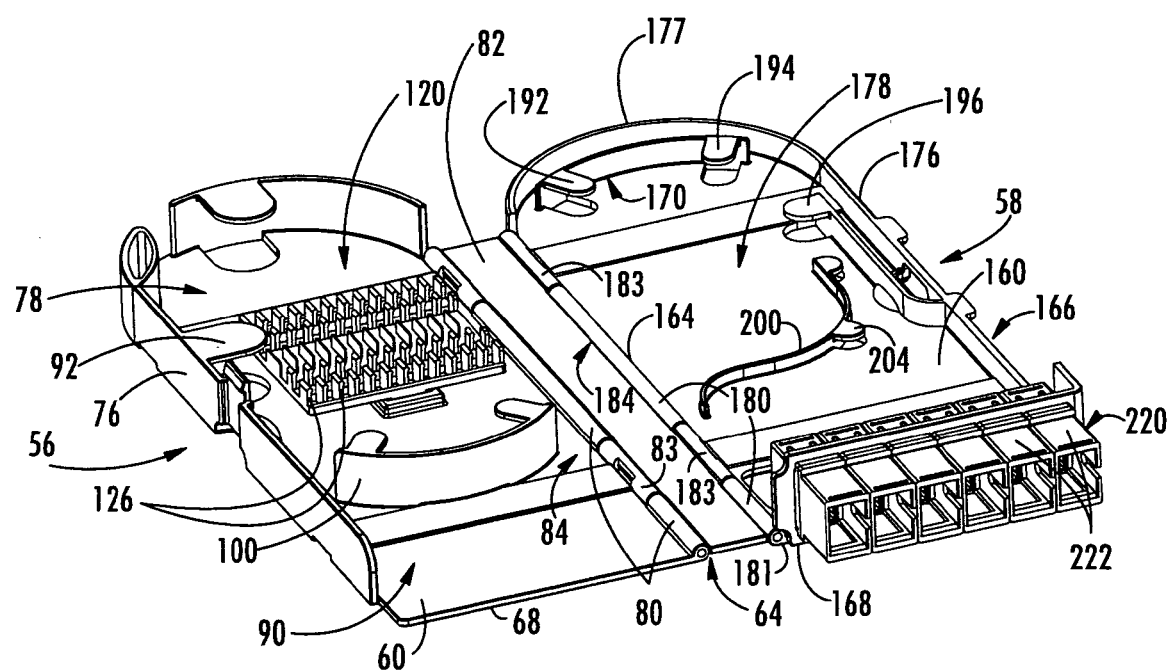
FIG. 4 is a top perspective view of an example embodiment of the adapter module of FIG. 3, wherein the module section includes a splice holder.

Module section 56 further includes a curved interior wall section 100 attached to panel 60 and located approximately between the middle of the panel and straight end 68. Interior wall section 100 is arranged with its curve being convex toward straight end 68. Interior wall section 100 also includes two spaced apart tongues 102 and 104 that extend inwardly from the top of the wall section into interior region 78. A mounting member 130 is arranged on panel 60 between the curved wall section 77 and curved interior wall section 100. Mounting member 130 is configured to hold a splice holder 120 to panel 60, as is illustrated in FIG. 4. Splice holder 120 includes a number of slots 126 for supporting first and second spliced optical fibers (not shown) at their splice locations.

With reference again to FIG. 3, module section 58 includes a panel 160 similar in size and shape to panel 60. Panel 160 includes parallel inside and outside edges 164 and 166, a straight end 168 perpendicular to the parallel sides, and a rounded edge 170 opposite the straight end. A sidewall 176 with a slightly shorter height than sidewall 76 is attached to outside edge 166 and runs from close to straight end 168 and around rounded edge 170. Sidewall 176 includes a curved section 177 that curves around rounded edge 170. Panel 160 and sidewall 176 define an open interior region 178 for module section 58.

Inside edge 164 includes hinge portions 180 that are interlocked with hinge portions 183 on hinge panel 82. A hinge rod 181 passes through both hinge portions 180 of panel 60 and hinge portions 183 of hinge panel 82 to form a hinge 184. Hinges 184 and 84 and hinge panel 82 form a hinge section that connects module sections 56 and 58 in a manner that allows the two module sections to be open and to close together. In an example embodiment, only one hinge 184 or 84 may be used.

Curved sidewall section 177 includes two tongues 192 and 194 that extend into interior region 178 from about half way up the sidewall. Sidewall 176 also includes a tongue 196 located near curved section 177 and that extends into interior 178 region from about half way up the sidewall.

Module section 58 further includes a curved interior wall section 200 attached to panel 160 at or near its middle. The height of curved interior wall section 200 is preferably less than that of curved interior wall section 100. The curvature of interior wall section 200 is convex facing generally toward straight end 168, preferably on a slight angle thereto, as shown. Curved wall section 200 also includes two spaced apart tongues 202 and 204 that extend outward from the top of the wall section, i.e., away from interior region 178.

Module section 58 further includes an array 220 of one or more fiber optic adapters 222 arranged at straight end 168. Adapters 222 are configured to mate at one side (i.e., the side exterior to interior region 178) with at least one fiber optic connector 230, such as for example an SC-type fiber optic connector connected to a fiber optic cable 232, as shown. In an example embodiment, fiber optic cable 232 and connector 230 constitute a jumper 12J.

With continuing reference to FIG. 3, adapter module 50 includes one or more bend-insensitive optical fibers 12. One such optical fiber from an optical fiber cable (not shown) is cable fiber 12C and is shown for the sake of illustration. Cable fiber 12 enters module section 56 at wall gap 88 and is fed into interior region 78 of module section 56 so that it loops around the inside (i.e., the concave side of) curved interior wall section 100. Optical fiber 12 then crosses over hinges 84 and 184 to module section 58, where it then curves around the inside of curved sidewall section 177. Optical fiber 12C then runs around the outside (i.e., the convex side) of curved interior wall section 200 and then back over hinges 184 and 84 to module section 56, where it runs around the inside of curve sidewall section 177 and then retraces its route around curved interior wall section 100, curved wall section 177 and the convex side of curved interior wall 200. Thus, in an example embodiment, optical fiber 12C is supported by adapter module 50 as wound in a "figure eight" pattern when the two module halves are open. However, on the second pass around the outside of curved interior wall 200, optical fiber 12C travels to one of the adapters 222 and is optically connected thereto. Note that the various tongues 92, 94, 102, 104, 192, 194, 196, 202 and 204 serve to guide and maintain cable fiber 12C around its path within module sections 56 and 58. Note that in other embodiments, cable fiber 12C may only need to be wound once around interior wall 100 and curved wall section 177 in an S-shape configuration prior to being connected to an adapter 222. In an example embodiment, some cable fibers 12C are wound in the "figure eight" configuration, while others are wound in the "S-shaped" configuration. Each cable fiber 12C, however, each has a serpentine configuration with at least two bends at interior wall 100 and curved wall section 177, respectively.

Once optical fiber 12C is so arranged within module sections 56 and 58, the two module sections are then rotated on their respective hinges 84 and 184, as illustrated in FIG. 5. FIG. 6 illustrates adapter module 50 in its closed configuration. When adapter module 50 is closed and the module sections are mated, the open interior regions 78 and 178 of respective module sections 56 and 58 combine to form a closed module interior 242. Also, when the module sections 56 and 58 are mated, the serpentine configuration of bend-insensitive cable fiber 12C becomes a substantially circular loop configuration within the module interior 242. Adapter module 50 is thus a cassette-like case that allows for a length of cable fiber 12C to wound tightly therein and held in a substantially circular loop configuration. This cassette-type configuration of adapter module 50 allows for the modules to be easily inserted into and removed from a housing assembly, as discussed below.

Example dimensions for adapter module 50 are 6" to 8" in length, 3" to 4" in width, and about 1" in thickness. This is a very compact design made possible through the use of bend-insensitive optical fiber 12C and the structure of the adapter module that contains the optical fiber in a tightly wound configuration. As mentioned above, a number of bend-insensitive cable fibers 12C can be included in adapter module 50, up to the number of adapters 222 included in adapter array 220. In an example embodiment, the particular serpentine bending configuration for a given cable fiber 12C is determined by which adapter 222 the cable fiber is connected to, as determined by the person (e.g., field service personnel) who is connecting the cable fibers to the adapters.

Housing Assembly

Figure 7:
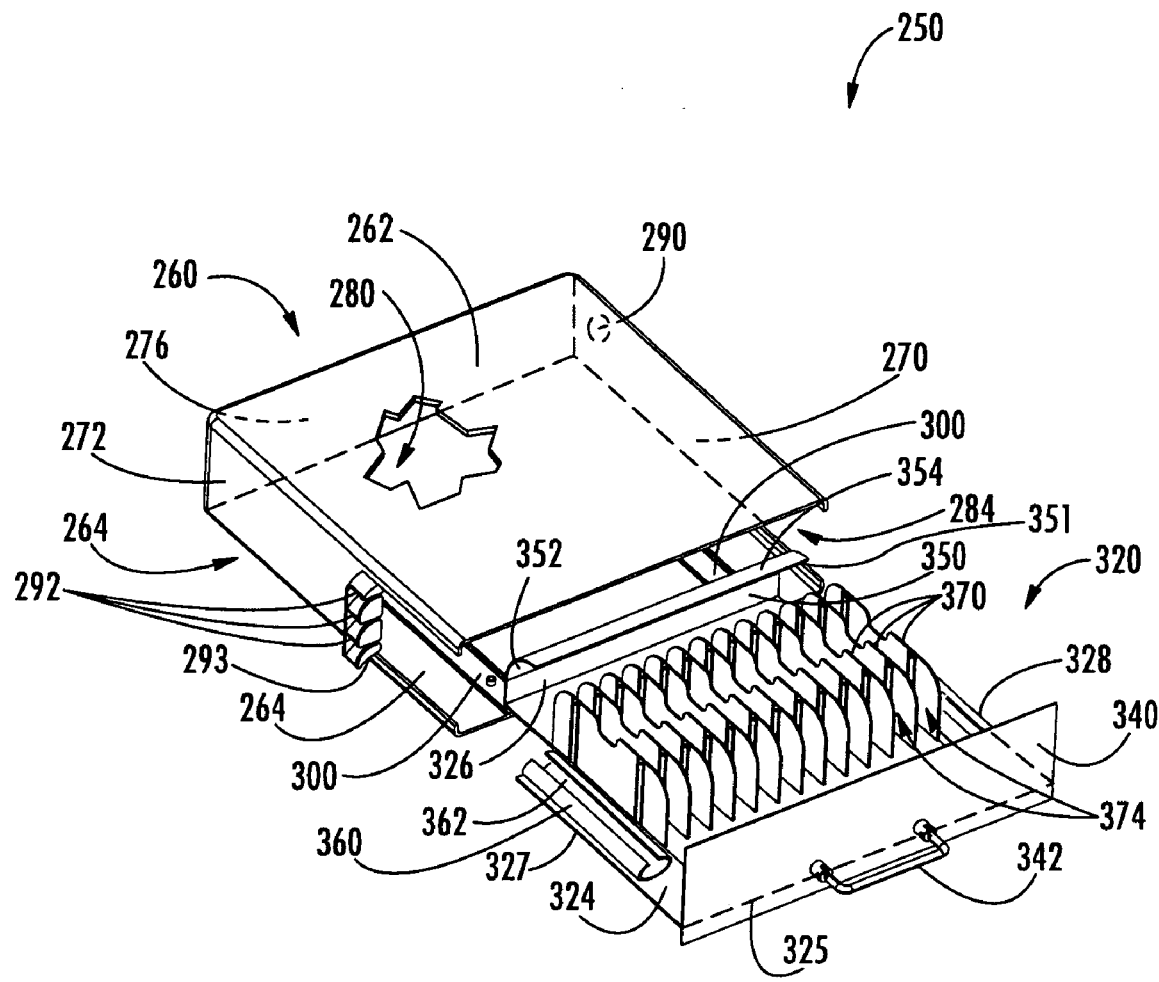
FIG. 7 is a top perspective view of the first example embodiment of a housing assembly configured to hold one or more adapter modules, the housing assembly is shown with its drawer open.

FIG. 7 is a perspective view of first example embodiment of a housing assembly 250 configured to hold one or more adapter modules 50. Housing assembly 250 includes a hard cover 260 having rectangular top and bottom opposing walls 262 and 264, opposing rectangular sidewalls 270 and 272, and a rectangular end wall 276. Top and bottom walls 262 and 264, sidewalls 270 and 272 and end-wall 276 define an interior region ("interior") 280 that has an open end 284 opposite end wall 276. In an example embodiment, cover 260 is made of a metal such as aluminum or stainless steel. Sidewall 270 includes one or more apertures 290 sized to pass one or more bend-insensitive cable fibers 12C. Sidewall 272 also includes one or more apertures 292 each sized to pass one or more jumper fibers 12J, as explained in greater detail below. Bottom wall 264 supports two spaced apart guide rails 300 that run parallel to each other and to sidewalls 270 and 272.

Housing assembly 250 includes a drawer 320 configured to clearance fit within cover interior 280. In an example embodiment, drawer 320 has a floor panel 324 with a front end 325, a back end 326, and opposite side edges 327 and 328. Floor panel 324 also has an underside 329 (see FIG. 9). Drawer 320 includes a front panel 340 connected at or near its bottom edge to front end 325 of floor panel 324. Front panel 340 has a handle 342 affixed thereto. Drawer 320 also includes a back panel 350 connected at its bottom end to back end 326 of floor panel 324. Back panel 350 has first and second ends 351 and 352 and a curved top portion 354 that curves downward in the direction of front panel 340. In an example embodiment, drawer 320 further includes at least one tubular guide member 360 having a longitudinal upper opening 362 formed therein. Guide member(s) 360 is/are arranged on floor panel 324 at one or both side edges 327 and/or 328 and running parallel thereto.

In one example embodiment, drawer 320 includes an array of vertical blade-like support members 370 attached to floor panel 324 and that run parallel to floor panel edges 327 and 328. Support members 370 are spaced apart from one another to form slots 374 each sized to accommodate an adapter module 50, as shown in FIG. 8, and discussed in greater detail below.

Figure 9:
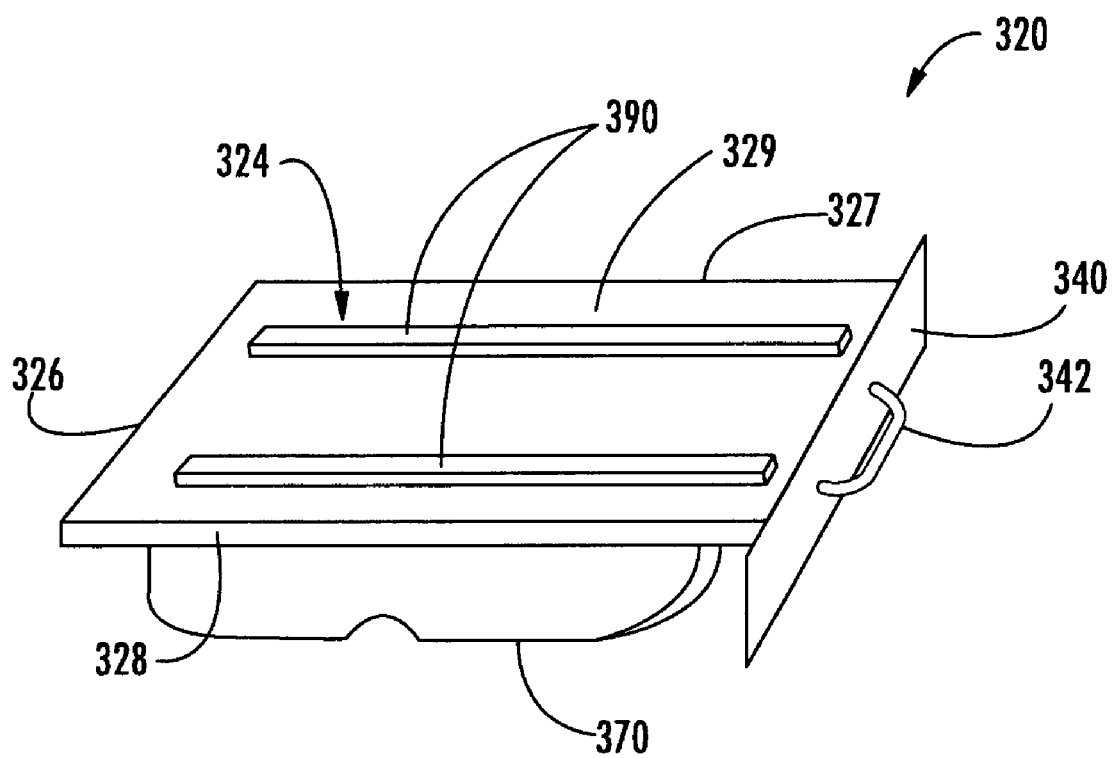
FIG. 9 is a perspective view of the back of the drawer of the housing assembly, showing a pair of guide members that engage with guide rails of the cover so that the drawer can slide in and out of the cover interior.

FIG. 9 is a perspective view of the back of drawer 320, showing on the underside 329 of floor panel 324 a pair of guide members 390 that engage with guide rails 300 of bottom wall 264 so that drawer 320 can slide in and out of cover interior 280.

Figure 8:
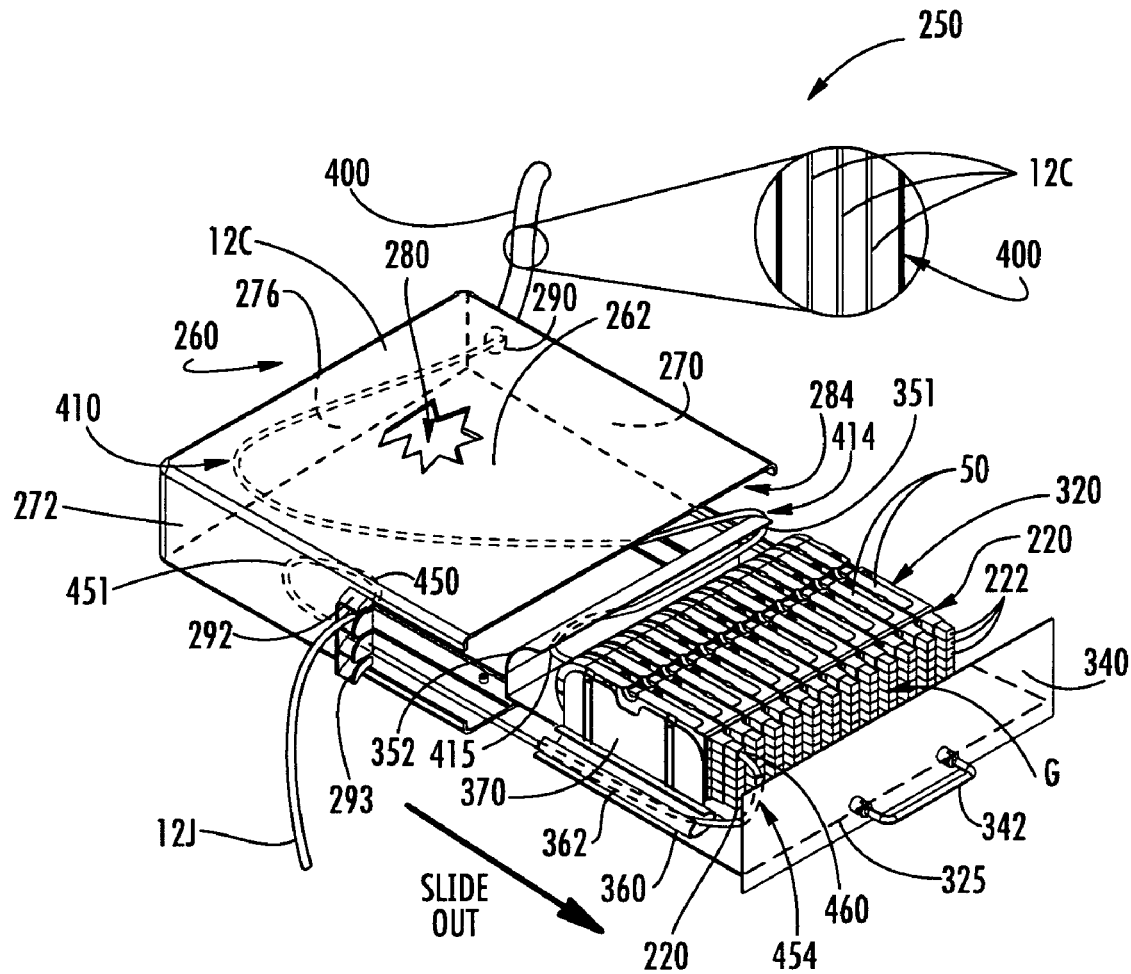
FIG. 8 is the same as FIG. 7, but showing adapter modules held within the slots formed by the blade-like support members and showing a bend-insensitive cable fiber and a bend-insensitive jumper fiber connected to one of the adapter modules.

FIG. 8 is similar to FIG. 7, showing housing assembly 250 further including a bend-insensitive fiber optic cable ("cable") 400 interfaced with cover 260 at aperture 290. Fiber optic cable 400 carries one or more bend-insensitive cable fibers 12C (see inset). Also, FIG. 8 shows a number of adapter modules 50 being held within slots 374 (see FIG. 7), thereby providing an array of adapters 222 to which jumper fibers 12J can be connected. The adapter array 222 faces front panel 340 and defines a front panel gap G between the two that allows for jumper fibers 12J to be connected to the adapters in the adapter array, albeit with relatively significant bending.

Bend-insensitive fiber cable fibers 12C enters cover 260 via apertures 290 formed in sidewall 270. FIG. 8 shows a single bend-insensitive cable fiber 12C winding through housing assembly 250 for ease of illustration, though in a preferred embodiment housing assembly 250 includes many (tens or even hundreds of) cable fibers 12C. Cable fiber 12C is arranged in a serpentine configuration, and in particular is provided with a first bend 410 so that it winds around cover interior 280 and forms a second bend 414 at end 351 of rear panel 350. Bend 414 allows cable fiber 12C to be engaged and guided by curved top portion 354 of back panel 350 of drawer 320. Cable fiber 12C includes third loop 415 that causes the fiber to head toward a particular adapter module 50 and be contained therein as described above. Cable fiber 12C then terminates at a given one of adapters 222 therein.

Other cable fibers 12C are similarly routed within the same or a different adapter module 50 to provide optical connections to jumper fibers 12J via adapters 222. The degree of bend (i.e., the bend radius or bend diameter) of cable fibers 12C is determined by the particular adapter module 50 to which the fiber is to be connected. The serpentine configuration of cable fiber 12C respectively expands and contracts as the drawer is opened and closed. This is due to bends 410 and 414 respectively increasing and decreasing their bending radius (or bending diameter $D_B$). The bend insensitivity of cable fibers 12C allows for adapter housing 250 to be compact because the cable fibers can be packed into a small space and severely bent at bends 410 and 414, particularly when drawer 320 is closed With continuing reference to FIG. 8, housing assembly 250 includes at least one bend-insensitive jumper fiber 12J, and in an example embodiment includes many (e.g., tens or even hundreds of) jumper fibers. One jumper fiber 12J is shown in FIG. 8 for the ease of illustration. Jumper fiber 12J passes through one of the apertures 292 in sidewall 272. In an example embodiment, apertures 292 include a fiber guide 293 that helps guide the jumper fibers into cover interior region 280. In one example embodiment, jumper fiber 12J is configured to have a left-hand bend 450 so that the jumper fiber initially runs toward back end wall 276. Jumper fiber 12J then includes a second bend 451 so that the jumper fiber loops back on itself and runs toward cover opening 284 and then to drawer 320, where it passes through tubular guide member 360 and runs toward front panel 340. Note that longitudinal upper opening 362 in tubular guide member 360 facilitates inserting the jumper fiber into the top of the tubular guide member so that it can be guided thereby. Jumper fiber 12J is then configured to have another relatively sharp bend 454 so its connectorized end 460 can be fed into the front panel gap G and connected to one of the adapters 220 in adapter array 222.

In another example embodiment, bend 450 is a "right turn" or a "right angle" in jumper fiber 12J right after aperture 292 so that the jumper fiber heads straight toward front panel 340 without "loop-back" bend 451. In an example embodiment, some jumper fibers 12J have the "right angle" bend 450 while others have the left-hand bend 450 and the "loop back" bend 451. In an example embodiment, the particular bend configuration of jumper fibers 12J is determined by the person (e.g., field service personnel) charged with installing the jumper fibers in housing assembly 250.

Figure 10:
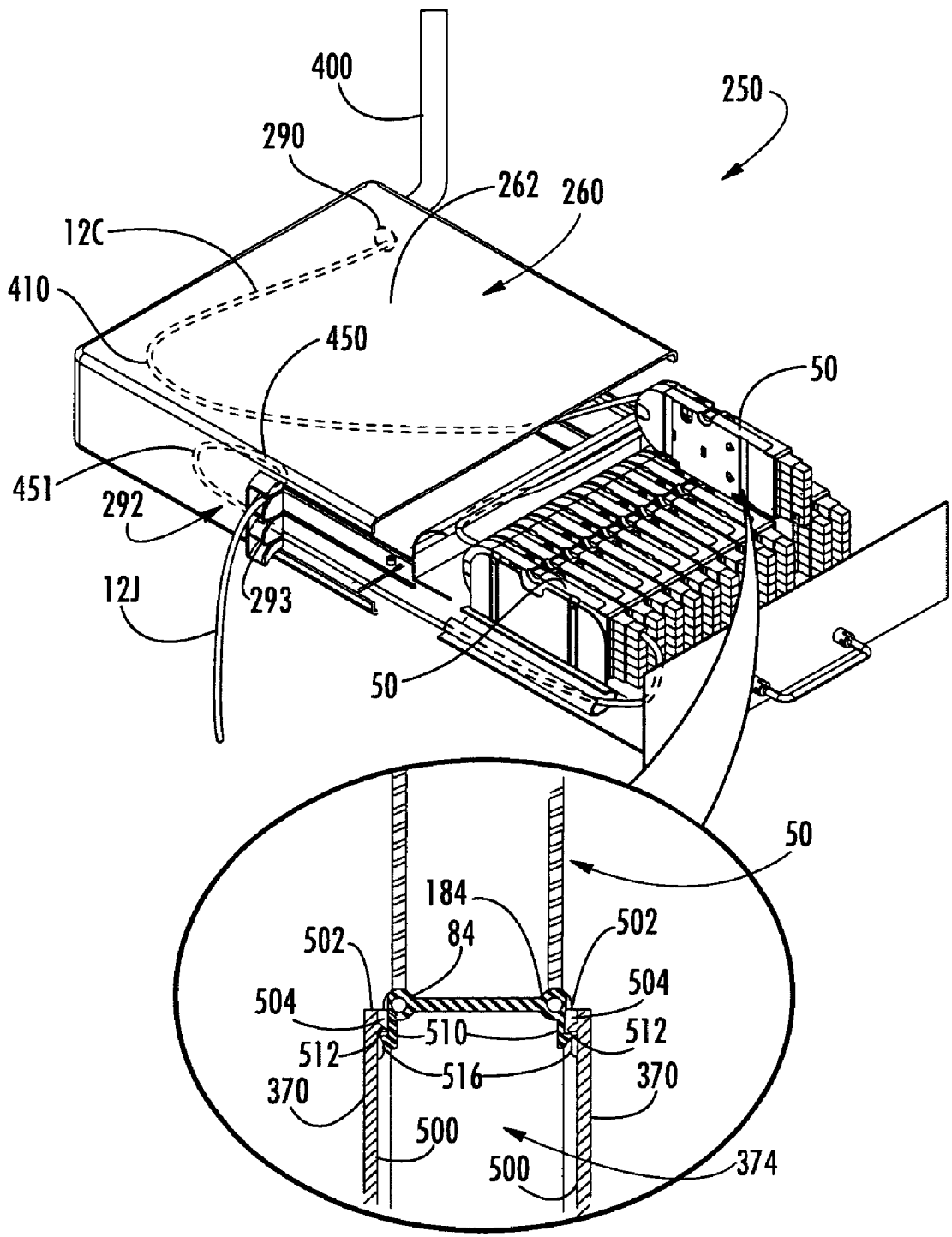
FIG. 10 is similar to FIG. 8, but shows an example embodiment wherein adapter modules are slideably mounted within the slots between the support members so that each adapter module can be slid upward to stand above the other adapter modules for easy access.

FIG. 10 is similar to FIG. 8, but shows an example embodiment wherein adapter modules 50 are slideably mounted within slots 374 so that each can be slid (lifted) upwardly (away) from bottom panel 324 so as to stand above the other modules. This facilitates the connection of jumper fibers 12J to adapters 222 and also facilitates the operation of running cable fibers 12C through the adapter modules as described above.

With reference to the inset of FIG. 10, there is shown a close-up cross-sectional view of an adapter module 50 and two of the vertical support members 370 that form corresponding slots 374. In an example embodiment, each vertical support member 370 includes an inner surface 500 with top end 502 and a lip 504 formed on the inner surface near the top end. Likewise, adapter module 50 includes respective tabs 510 that downwardly depend from hinges 84 and 184 and that include outwardly extending lips 512 that engage lips 504 of vertical support members 370 when the adapter module is slid upwardly. The addition of detents 516 on tabs 510 just below each lip 512 allows for adapter module 50 to snap-lock into its position above slot 374, and to be snap unlocked back into its position in slot 374. A similar configuration can be used to slide adapter modules 50 horizontally rather than vertically.

Figure 11:
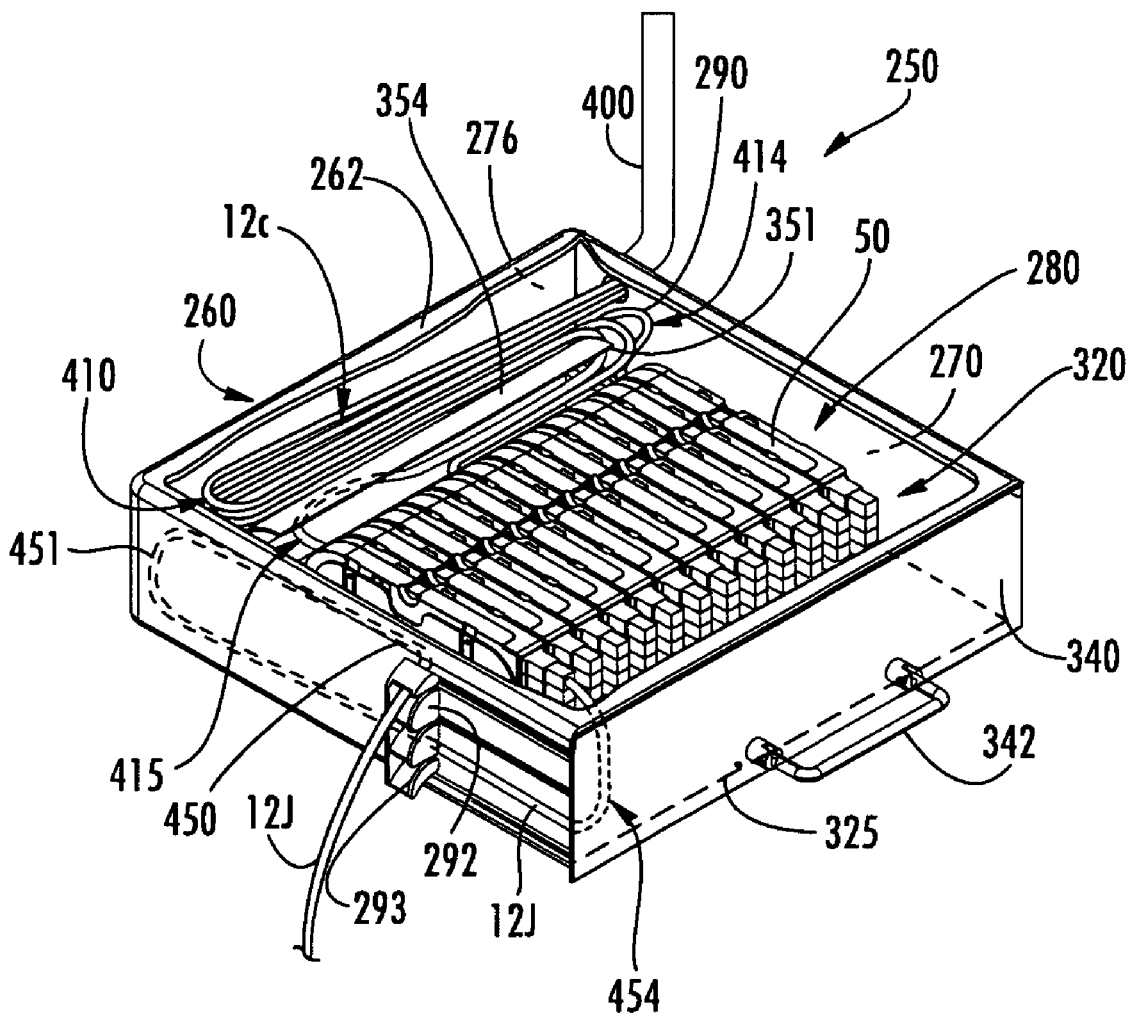
FIG. 11 is similar to FIG. 8, but shows the drawer closed so that adapter modules are stored within cover interior, and illustrating the tight bends formed in the cable fibers and jumper fibers.

FIG. 11 is similar to FIG. 8, but shows drawer 320 closed so that adapter modules 50 are stored within cover interior 280. Fiber guide 360 is omitted for the sake of illustration. Also shown are a number of cable fibers 12C. Note that bends 410, 414 and 415 in cable fibers 12C and bends 450, 451 and 454 in jumper fiber 12J have a relatively small bend radius. This is made possible by the bend insensitivity of the cable and jumper fibers 12C and 12J. Tubular guiding member 360 allows portions of jumper fiber 12J to slide therethrough as drawer 320 is opened and closed. This allows housing assembly 250 to minimize slack storage of cable and jumper fibers 12C and 12J without sacrificing optical performance. Housing 250 also allows for easy access to the individual adapter modules 50 with minimal disruption to other modules and/or to the fiber routing. Moreover, housing 250 allows for a relatively large number of adapter modules 50 to be contained in a relatively small space.

Figure 12:
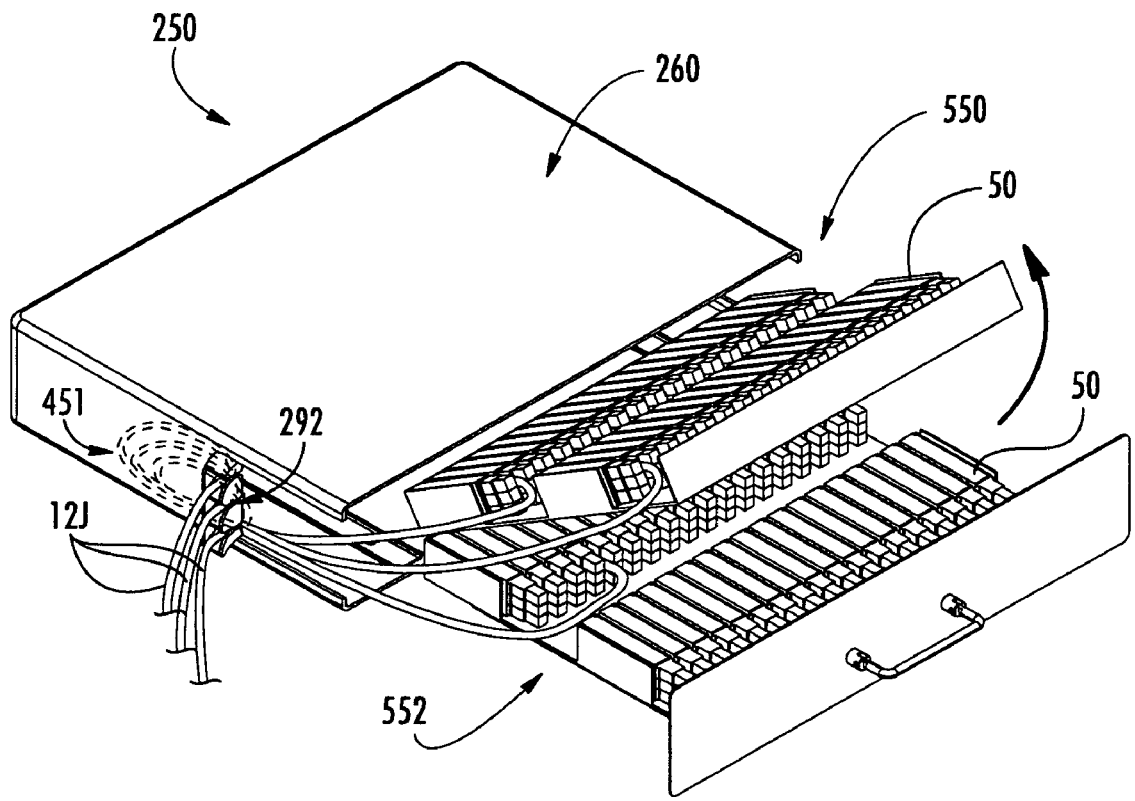
FIG. 12 is a perspective view of an example embodiment of housing assembly similar to that shown in FIG. 8, but wherein adapter modules are stored in the drawer in a stacked manner in upper and lower trays.

FIG. 12 is a perspective view of an example embodiment of housing assembly 250 similar to that shown in FIG. 8, but wherein adapter modules 50 are stored in stacked upper and lower trays 550 and 552. In an example embodiment, upper and lower trays 550 and 552 are connected at their back via a hinge (not shown). The front of upper tray 550 lifts up to provide access to the adapter modules in lower tray 552. In an example embodiment, a number of trays 550, 552, etc. (e.g., two or more) can be stacked to form layers of adapter modules 50.

Frame Assembly

Figure 13:
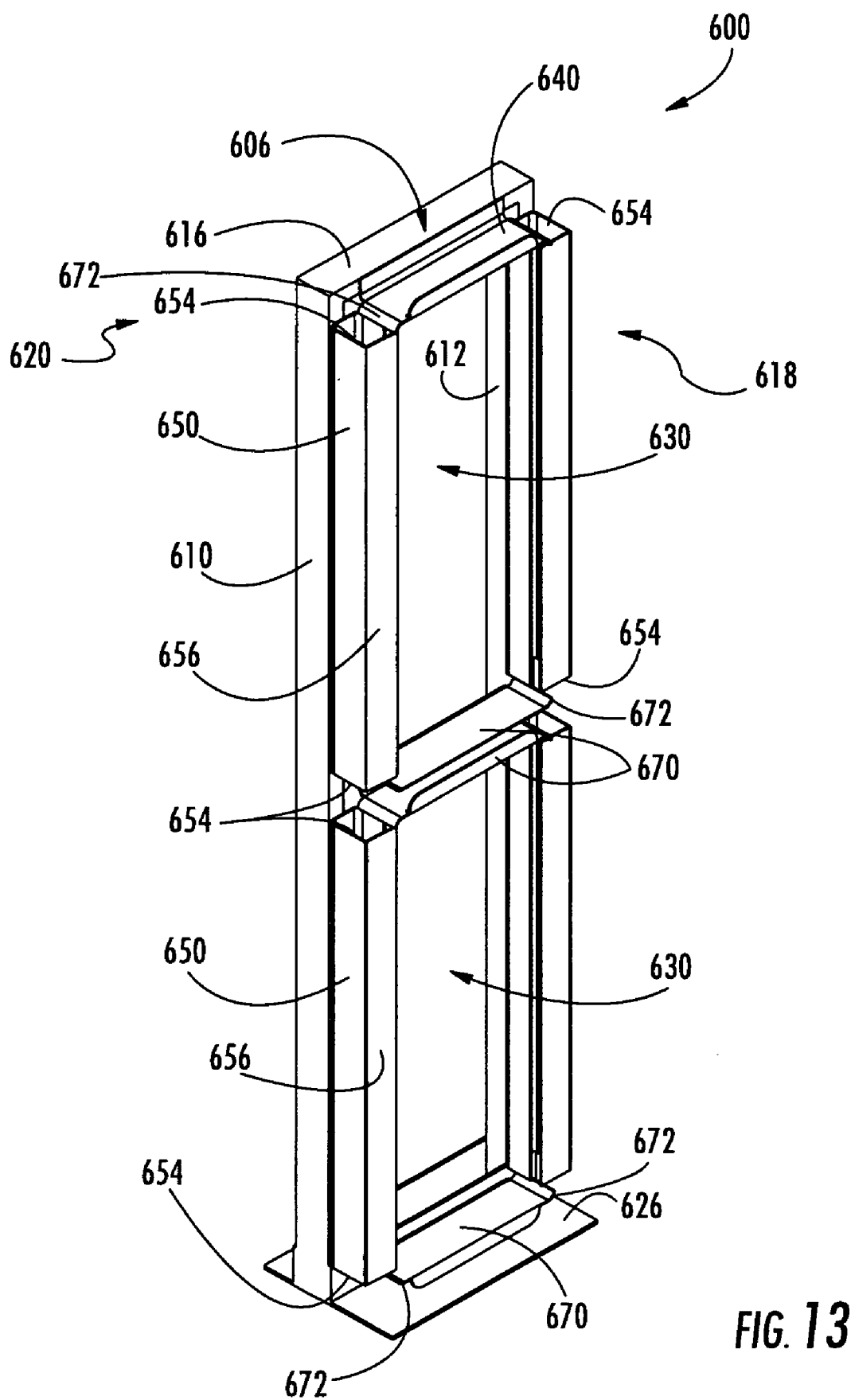
FIG. 13 is a perspective view of an example embodiment of a frame for the frame assembly according to the present invention.
Figure 14:
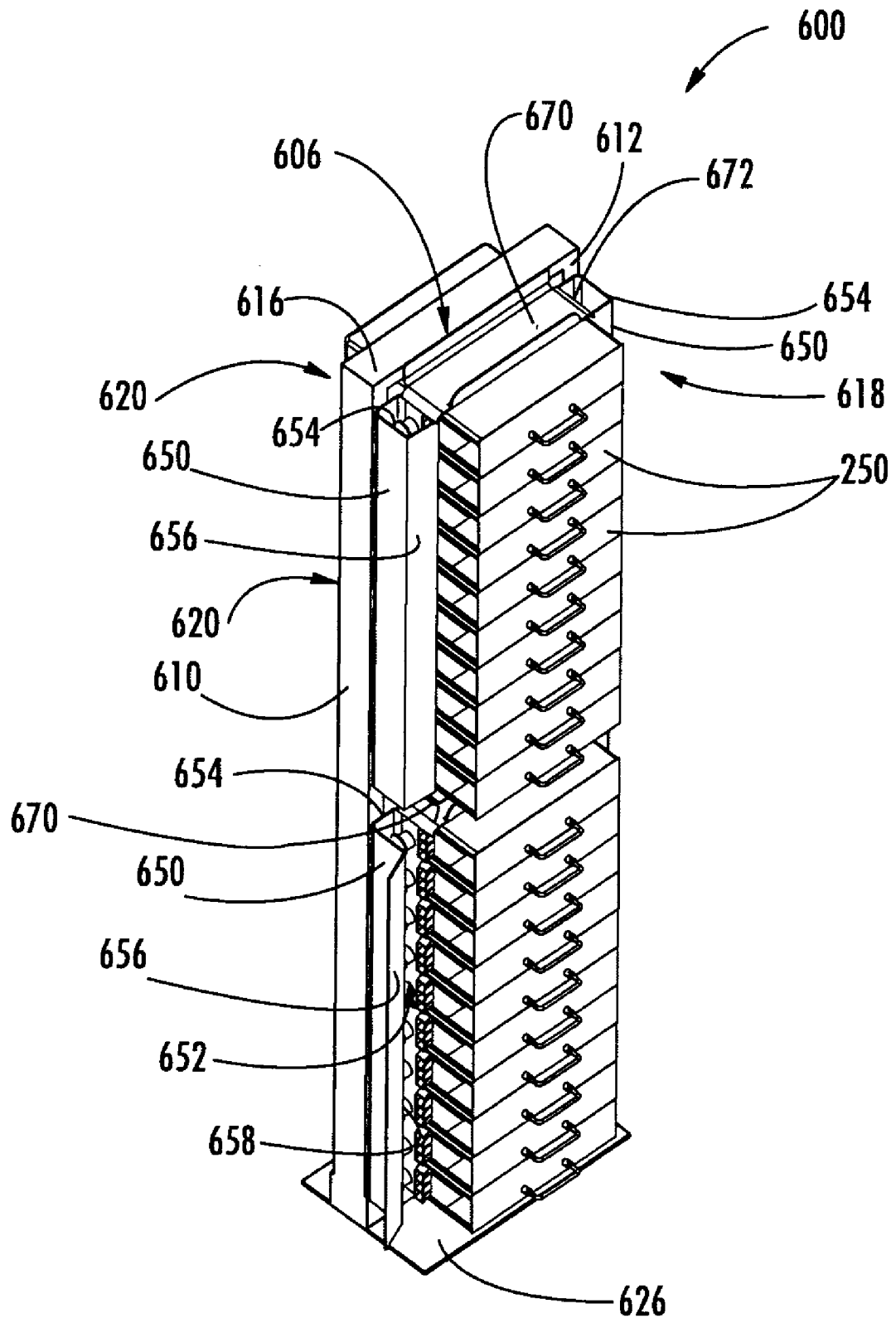
FIG. 14 is a perspective view similar to that of FIG. 13, but that further includes housing assemblies supported by the frame in a stacked configuration.

An aspect of the invention includes a frame assembly that houses the housing assemblies 250 described above. FIG. 13 is a perspective view of an example embodiment of a frame assembly 600 according to the present invention. Frame assembly 600 includes a frame 606 in the form of an inverted "U" that includes vertical side bars 610 and 612, and top horizontal cross-bar 616 that connects the side bars at the top of the frame. Frame 606 has a frontside 618 and a backside 620. Frame 606 includes a flat base 626 to which side bars 610 and 612 are attached, and which serves to provide standing support for the rest of the frame. Frame 606 defines an interior region 630 (i.e., the space inside the inverted "U"). The inside surface of side bars 610 and 612 allows for housing assemblies 250 to be arranged in a stacked manner between the side bars and thus within frame 600, as shown in FIG. 14. In one example embodiment, the inside surface of side bars 610 and 612 are smooth, while in another example embodiment they include guide tabs (not shown) that facilitate the stacking and support of housing assemblies 250 within frame 606. In an example embodiment, side bars 610 and 612 and cross-bar 616 have a width less than that of the width of housing assemblies 250 so that front and back portions of the housing assemblies protrude from the frontside 618 and backside 620 of frame 606, as illustrated in FIG. 14.

In an example embodiment, frame assembly 600 further includes at least one routing conduit 650 having an interior 652 and that is attached to side bars 610 and/or 612 at frontside 618 so that they run vertically. An example routing conduit 650 includes open ends 654 and has one side that serves as a door 656 that allows access to interior 652. Routing conduits 650 are open at the side closest to housing assemblies 250 and are sized so that at least one (and preferably many) jumper fibers 12J can run inside the routing conduit and be connected to the adapter modules in the housing assemblies. In an example embodiment, a number of routing guides 658 are arranged in routing conduit interior 652

Frame assembly 600 further includes at least one routing trough 670 having opposite ends 672. Routing trough 670 runs horizontally so that ends 672 are adjacent routing conduit open ends 654 located on opposite side bars 610 and 612. This allows for establishing internal pathways within the frame assembly for jumper fibers 12J to be connected to different housing assemblies 250 and adapter modules therein.

Figure 15A:
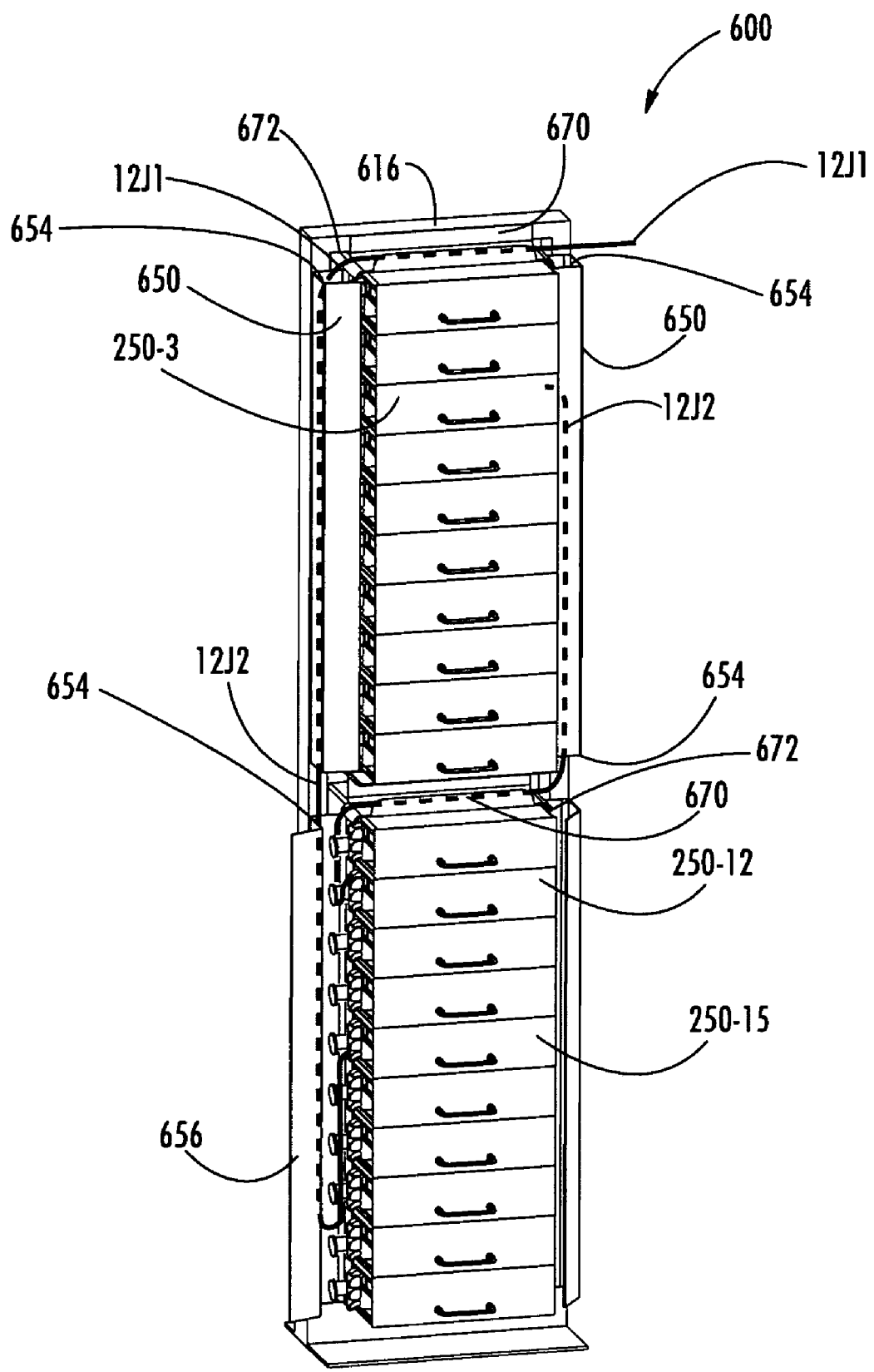
FIG. 15A is similar to FIG. 14 and shows two jumper fibers supported by the frame assembly and routed by the routing conduits and the routing troughs to two different housing assemblies.
Figure 15B:
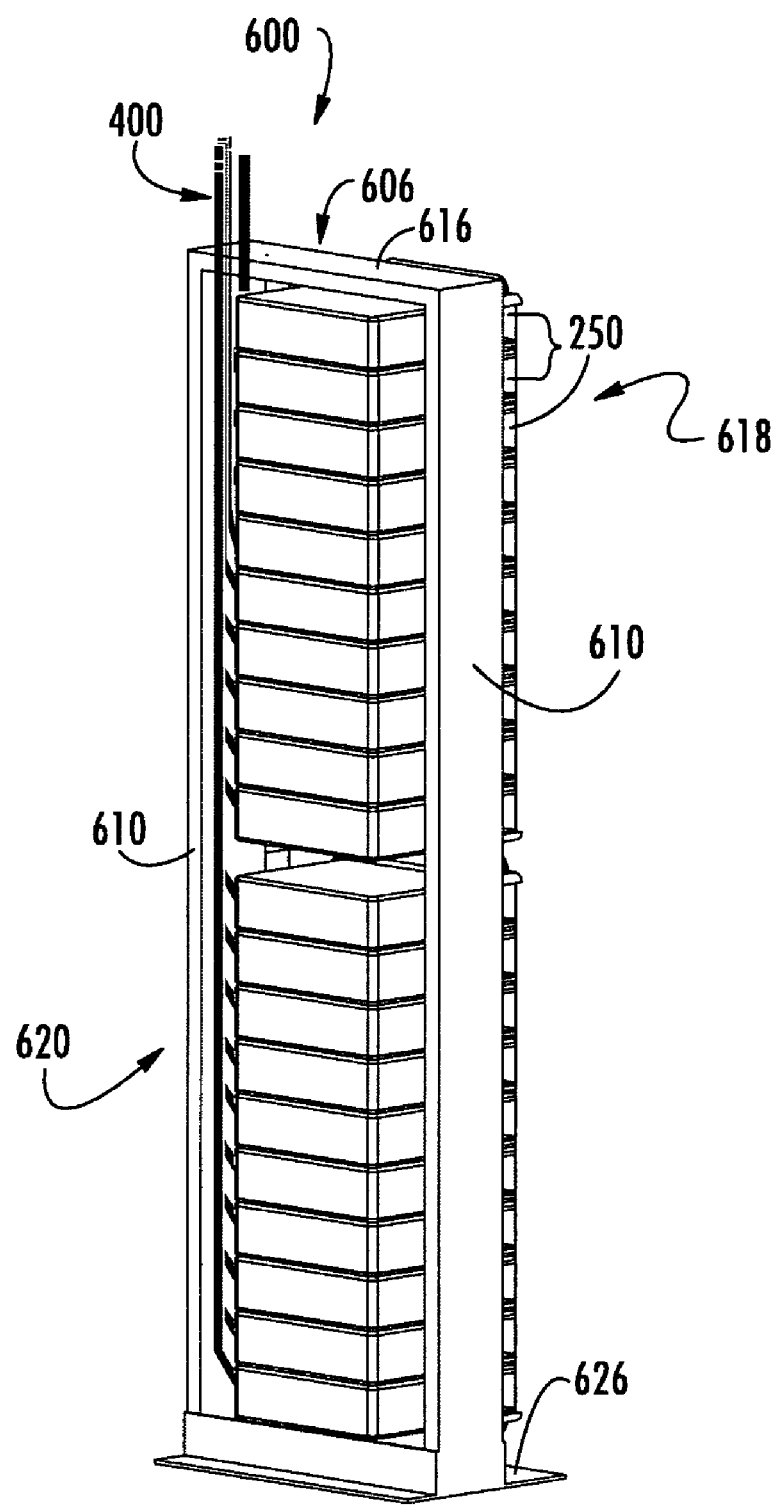
FIG. 15B is a rear perspective view of the frame assembly of FIG. 15A, showing how the optical fiber cables that carry the cable fibers are routed to the different housing assemblies at the back of the frame assembly.

With reference now to FIG. 15A, there is shown two jumper fibers 12J1 and 12J2 incorporated into frame assembly 600. FIG. 15B is a rear perspective view of the frame assembly 600 of FIG. 15A, showing how fiber optic cables 400 are routed through frame 606 at backside 620 and connected to the various housing assemblies 250 to deliver the cable fibers 12C to the adapters therein, as discussed above in connection with FIG. 8.

With reference to FIG. 15A, jumper fiber 12J1 originates at another frame assembly 600 (not shown) and travels from right to left over upper routing trough 670 and into open upper end 654 of left-hand-side upper routing conduit 650. Jumper fiber 12J1 then travels down the length of the conduit, exits at its open lower end 654 and then enters the open end 654 of the lower left-hand-side routing conduit 650. Jumper fiber 12J1 then loops around within routing conduit interior 652 and then enters housing assembly 250-15, where it connects to one of the adapters therein, as described above. The loop within routing conduit interior 652 allows for the slack in jump cable 12J1 to be stored within the frame assembly rather than dangling on the outside of the frame assembly.

The other jumper fiber 12J2 starts from one of the adapters in housing assembly 250-3 and proceeds down right-hand-side upper routing conduit 650, out the bottom open end 654 thereof, over middle routing trough 640, and into open end 654 of the left-hand-side routing conduit. Jumper fiber 12J2 then travels down this conduit and enters housing assembly 250-12, where it connects to one of the adapters therein. Frame assembly 600 is thus able to accommodate large numbers (e.g., hundreds) of jumper fibers in a relatively compact space within the frame assembly.

Figure 16A:
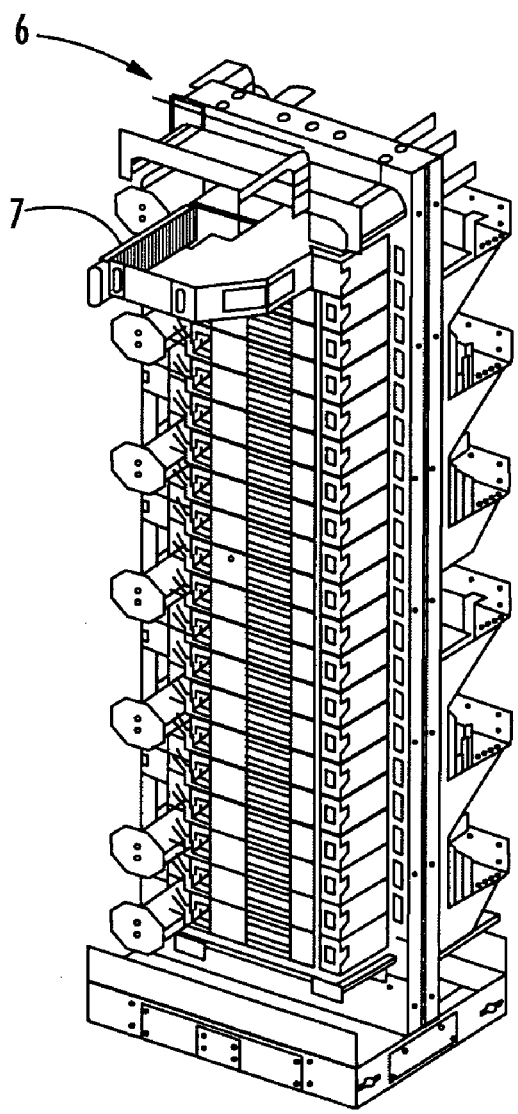
FIG. 16A is a front perspective view of a prior art frame assembly.
Figure 16B:
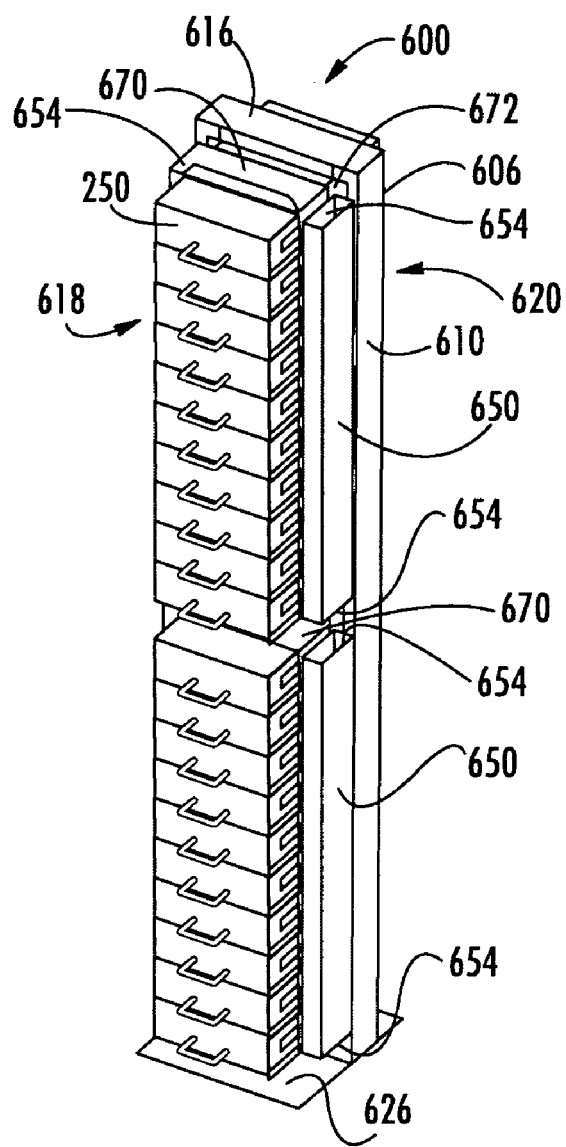
FIG. 16B is a front perspective view of the frame assembly of the present invention shown at the same scale as the prior art frame assembly of FIG. 16A to illustrate the relative compactness and smaller footprint of the frame assembly of the present invention.

FIG. 16A is a front perspective view of a prior art frame assembly 6, and FIG. 16B is a similar front perspective view of frame assembly 600 of the present invention. FIGS. 16A and 16B have the same relative scale for comparing the size of the two frame assemblies. Prior art frame assembly 6 has housing assemblies 7. Jumper fibers are not shown in FIG. 16A, but would run unenclosed and down the outside of the frame assembly. Not only is frame assembly 600 of the present invention significantly smaller than the prior art frame assembly 6, but it is also configured to enclose jumper fibers 12J rather than letting them dangle down the sides of the frame. Such a clean configuration makes it much easier to store and manage the many different jumper fibers used in a central office application. Example dimensions of prior art frame assembly 6 are 30" wide by 24" deep by 91" tall, while corresponding dimensions for frame assembly 600 of the present invention are 19"×15"×84". Footprint-wise, the difference between the two is about 3 square feet per frame assembly. Said differently, five frame assemblies 600 can fit into the footprint of two of the prior art frame assemblies 6.

Volume-wise, this represents a savings of about 24 cubic feet per frame assembly. Additional space savings occurs by virtue of the frame assembly 600 of the present invention only requiring front access and not both front and rear access. The footprint difference in this regard is about 14 square feet per frame assembly. This is a very large space savings in the context of a central office of a telecommunications system.

Figure 17:
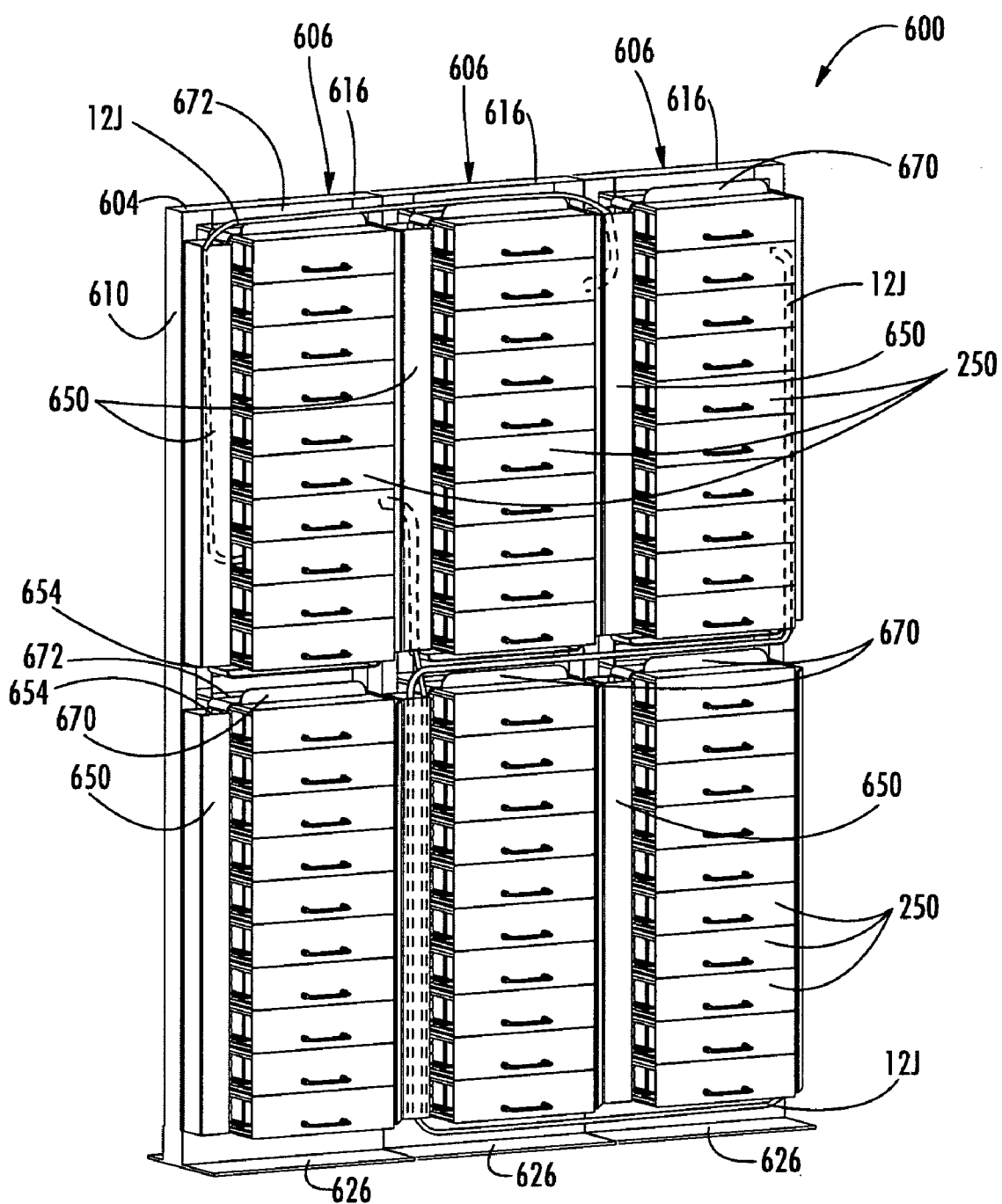
FIG. 17 is a front perspective view of an example embodiment of a frame assembly that includes three of the frame assemblies of FIG. 14 that support three different telecommunication functions.

FIG. 17 is a front perspective view similar to FIG. 14, but illustrating an example embodiment of a frame assembly 600 wherein three single-frames 606 are combined to form a one large frame assembly that includes video, wave-length-division multiplexing (WDM) and voice housing assemblies 250 all stacked next to one another to facilitate their interconnection via jumper fibers 12J routed through routing conduits 650 and/or routing troughs 670. Cable fibers 12C are provided to the different housing assemblies 250 at the backside 620 of the frame assembly as discussed above and so are not shown in FIG. 17.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An adapter module that supports at least one bend-insensitive optical fiber, comprising:
   first and second module sections configured to mate when folded together so as to form a module interior, the first and second module sections adapted to maintain the at least one bend-insensitive optical fiber in a serpentine configuration that includes at least first and second bends when the first and second module sections are open;
   an array of a plurality of adapters at an end of the second module section and configured to connect to an end of the at least one bend-insensitive optical fiber; and
   wherein, when the first and second module sections are folded together and mated, they enclose and support the at least one bend-insensitive optical fiber in a substantially circular loop configuration within the module interior.

2. The adapter module of claim 1, wherein the serpentine configuration includes a "figure eight" pattern.

3. The adapter module according to claim 1, further including a splice holder supported in the first module section.

4. The adapter module according to claim 1, wherein the first module section includes an aperture formed in a curved sidewall and sized to allow the at least one bend-insensitive optical fiber to enter the module interior from outside the module interior.

5. The adapter module of claim 1, wherein at least one of a curved sidewall and a curved inner wall of the first and second module sections includes at least one tongue configured to guide and maintain the at least one bend-insensitive optical fiber in its configuration within the module interior.

6. The adapter module of claim 1, further including at least one jumper fiber connected to at least one adapter of the array of a plurality of adapters.

7. The adapter module of claim 6, wherein the at least one bend-insensitive optical fiber contained within the module interior is a cable fiber, and the adapter module further including:
   a plurality of bend-insensitive cable fibers operably connected to a corresponding plurality of adapters, each of the plurality of bend-insensitive cable fibers operably connected to a corresponding one of the plurality of adapters at a first end, the first end located within the module interior.

8. The adapter module of claim 6, further including:
   a plurality of bend-insensitive jumper fibers operably connected to a corresponding plurality of adapters, each of the plurality of bend-insensitive cable fibers operably connected to a corresponding one of the plurality of adapters at a second end, the second end located outside of the module interior.

9. The adapter module of claim 1, wherein the first and second module sections are connected by a hinge section configured to allow the first and second module sections to fold together and mate.

10. The adapter module of claim 1, wherein the first and second module sections each includes a curved sidewall and a curved inner wall that serve to maintain the at least one bend-insensitive optical fiber in the serpentine configuration.

11. A housing assembly for containing one or more adapter modules each having at least one adapter, so as to connect at least one bend-insensitive cable fiber having an end to at least one bend-insensitive jumper fiber having an end, comprising:
   a cover that defines a cover interior region with a rectangular cross-section and an open cover end;
   a drawer configured to clearance fit within the cover and slideably move into and out of the cover interior region to open and close the drawer, the drawer having means for holding the one or more adapter modules;
   wherein the at least one bend-insensitive cable fiber enters a rear portion of the cover and is arranged in a serpentine configuration having at least first and second bends and connected at the end of the at least one bend-insensitive cable fiber to at least one of the one or more adapter modules, wherein the serpentine configuration respectively expands and contracts when the drawer is opened and closed and wherein the drawer includes a front panel, and wherein the at least one adapter of the one or more adapter modules faces the front panel so as to define a front panel gap therebetween, and
   at least one bend insensitive jumper fiber wherein a portion of the at least one bend-insensitive jumper fiber resides in the front panel gap when the at least one bend-insensitive jumper fiber is connected to the one or more adapter modules.

12. The housing assembly of claim 11, wherein the drawer includes a back panel having a curved top portion that serves to maintain the at least one bend-insensitive cable fiber in the serpentine configuration at a second bend.

13. The housing assembly of claim 11, wherein the means for holding the one or more adapter modules includes a plurality of blade-like support members that define one or more slots configured to contain the one or more adapter modules.

14. The housing assembly of claim 13, wherein the plurality of blade-like support members is configured to allow the one or more adapter modules to be lifted upwardly away from a back panel of the drawer.

15. The housing assembly of claim 11, wherein the means for holding the one or more adapter modules includes stacked trays configured to support the one or more adapter modules in one or more layers within the drawer.

16. The housing assembly of claim 11, wherein the at least one bend-insensitive jumper fiber enters the cover and a portion of the at least one bend-insensitive jumper fiber runs toward the front panel and bends so as to connect at the end of the at least one bend-insensitive jumper fiber to an adapter of one of the one or more adapter modules.

17. The housing assembly of claim 16, wherein the at least one bend-insensitive jumper fiber enters an aperture formed in a side of the cover and is configured to include a first bend that causes a portion of the at least one bend-insensitive jumper fiber to first run away from the front panel and then a second bend that causes a portion of the at least one bend-insensitive jumper fiber to run toward the front panel.

18. The housing assembly of claim 16, wherein the at least one bend-insensitive jumper fiber enters an aperture formed in a side of the cover and is configured so that a portion of the at least one bend-insensitive jumper fiber runs directly toward the front panel.

19. The housing assembly of claim 11, wherein the drawer includes a bottom panel that supports a fiber guide member that guides a portion of the at least one bend-insensitive jumper fiber toward the front panel.

20. The housing assembly of claim 11, wherein:
the cover includes at least one first drawer guide member; and
the drawer includes at least one second drawer guide member configured to operably engage with the at least one first drawer guide member so that the drawer can be moved in and out of the cover interior.

21. A frame assembly, comprising:
a frame in the form of an inverted "U" that includes first and second vertical side bars, a top horizontal cross bar, and a base connected to the first and second vertical side bars, the frame having a front side and a back side and defining a frame interior; and
a plurality of housing assemblies according to claim 11 arranged within the frame interior in a stacked manner.

22. The frame assembly of claim 21, including a plurality of bend-insensitive cable fibers fed into a corresponding plurality of the housing assemblies via a fiber optic cable arranged at the back side of the frame.

23. The frame assembly of claim 21, further comprising at least one routing conduit having open opposite ends and an interior and attached to at least one of the first and second vertical side bars and that serves to route at least one jumper fiber to at least one housing assembly of the plurality of housing assemblies.

24. The frame assembly of claim 23, wherein the frame assembly further includes:
two or more routing guides; and
at least one routing trough having opposite ends and that runs horizontally so that the opposite ends are adjacent to open ends of two different routing guides so as to serve to route the at least one jumper fiber from one side of the frame to the other.

25. The frame assembly of claim 24, further comprising:
a first plurality of jumper fibers connected to a corresponding first plurality of adapters of one or more adapter modules and that are carried by the two or more routing guides and/or said at least one routing trough; and
a second plurality of cable fibers arranged at the back side of the frame and connected to a second corresponding plurality of adapters of the one or more adapter modules.

26. The frame assembly of claim 23, wherein the at least one routing conduit has a door that opens to the interior.

27. The frame assembly of claim 24 including two or more frames arranged adjacent to one another, with each frame supporting a plurality of stacked housing assemblies configured to be optically connected to one another using a plurality of jumper fibers routed via vertically oriented routing conduits and/or horizontally oriented routing troughs.

28. The frame assembly of claim 21, wherein the frame assembly has a footprint of about two square feet.

* * * * *